United States Patent [19]
Whitesell et al.

[11] Patent Number: 5,995,445
[45] Date of Patent: Nov. 30, 1999

[54] ACOUSTIC SURVEY TECHNIQUE

[75] Inventors: Eric James Whitesell; Darrell E. Marsh, both of San Diego; Shelby F. Sullivan, Solana Beach, all of Calif.

[73] Assignee: The United States of America as represented by the Secretary of the Navy, Washington, D.C.

[21] Appl. No.: 06/149,061

[22] Filed: Apr. 18, 1980

[51] Int. Cl.$^6$ ............................................. G01S 3/80
[52] U.S. Cl. ................................. 367/5; 367/129
[58] Field of Search ................ 367/3, 4, 5, 117, 367/123, 125, 128, 129, 130

[56] References Cited

U.S. PATENT DOCUMENTS

| | | | |
|---|---|---|---|
| 3,783,441 | 1/1974 | Slawsky | 367/5 |
| 4,001,763 | 1/1977 | Kits van Heyningen | 367/103 |
| 4,114,135 | 9/1978 | Funk | 367/3 |

*Primary Examiner*—Daniel T. Pihulic
*Attorney, Agent, or Firm*—Harvey Fendelman; Eric James Whitesell; John STan

[57] ABSTRACT

A system locates the elements of a randomly dispersed, untethered, array of sonobuoys from which are suspended active, transmitting, transducer elements and passive, receiving, transducer elements. The system comprises a data conditioning unit which receives high-frequency element-locating signals from a radio receiver, which may be located on an aircraft, and processes them so that they are quantized at its output. An acoustic delay processor, whose input is connected to the output of the data conditioning unit, correlates a reference signal R received from an active element suspended from the sonobuoy with a corresponding received signal from another element, active or passive, suspended from another sonobuoy.

A position tracker, whose input is connnected to the output of the acoustic delay processor, calculates the relative position of each element of the random array from the propagation delays measured by the acoustic delay processor. An operator interface, having inputs to and outputs from, the position tracker is used to enter and display appropriate system and processing parameters.

28 Claims, 15 Drawing Sheets

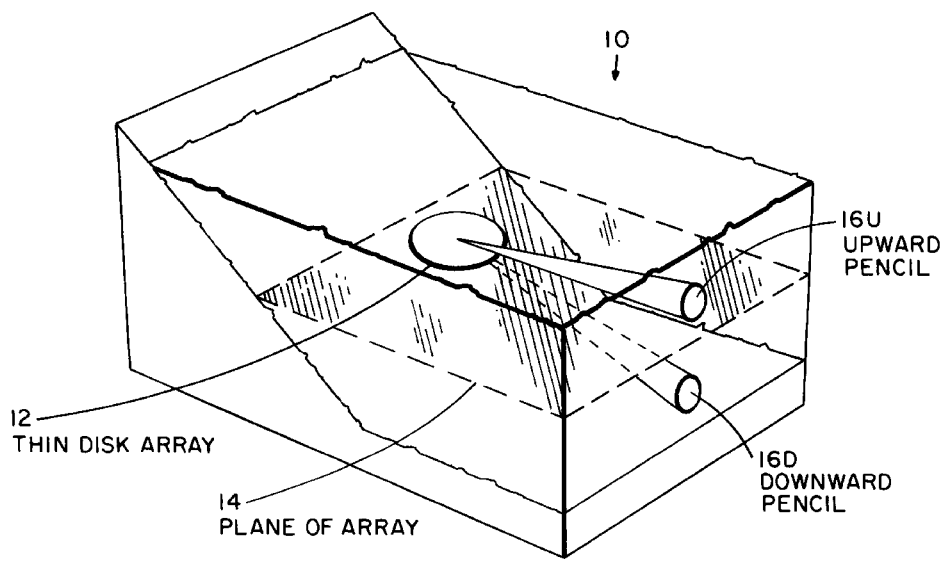
FIG. 1 TWO-DIMENSIONAL RANDOM SONOBUOY ARRAY WITH TYPICAL BEAM PATTERN.
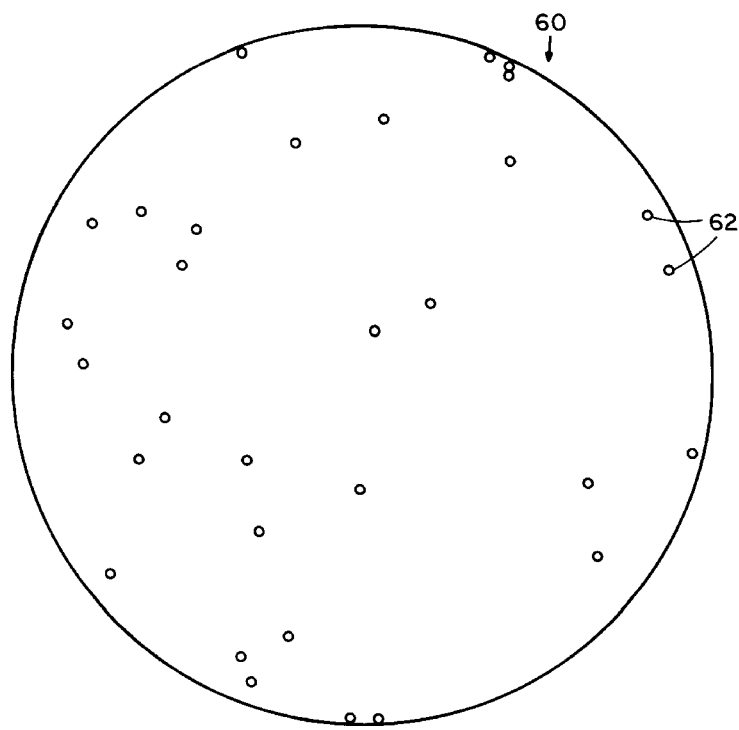
FIG. 4 COMPUTER-GENERATED PLOT OF UNIFORM RANDOM DISTRIBUTION OF 31 ELEMENTS OVER A CIRCULAR AREA 1200 FEET IN DIAMETER.

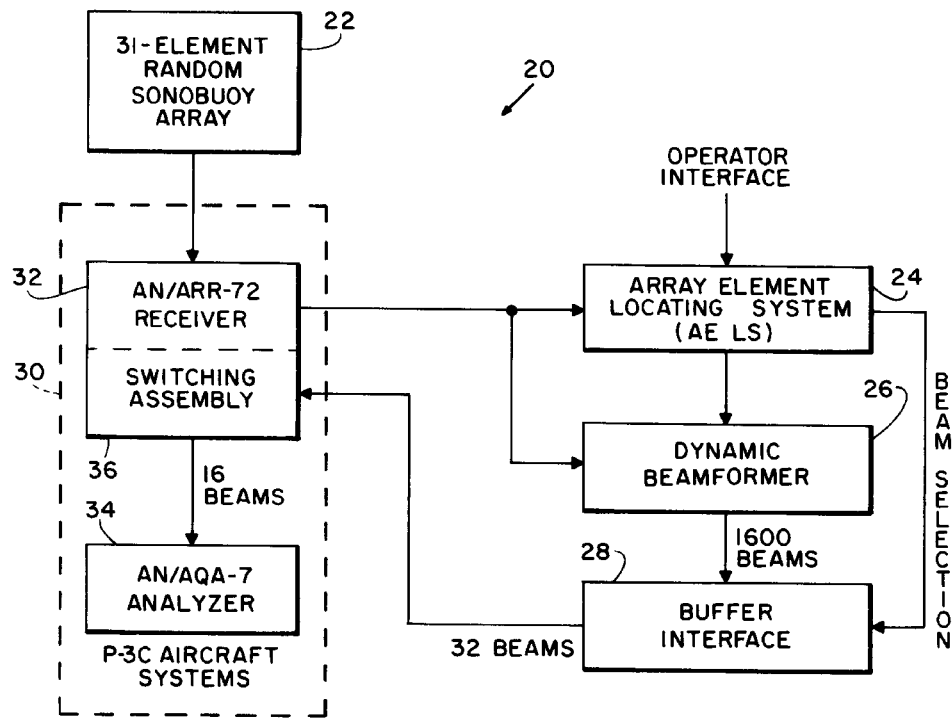
FIG. 2 SIMPLIFIED SONOBUOY THINNED RANDOM ARRAY SYSTEM.
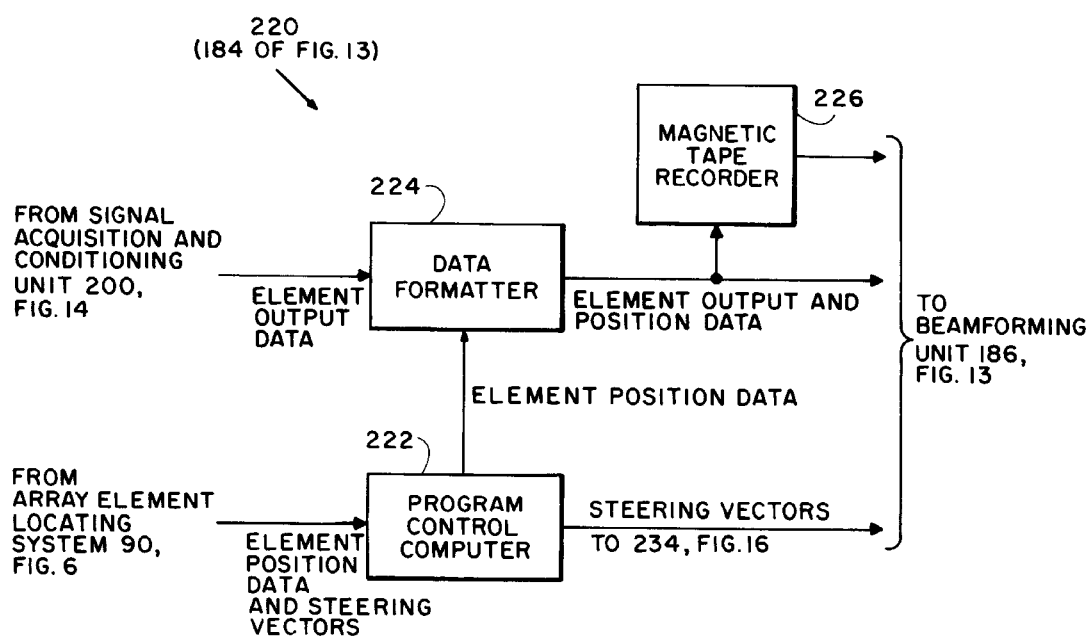
FIG. 15 PROGRAM CONTROL AND DATA FORMATTING UNIT.

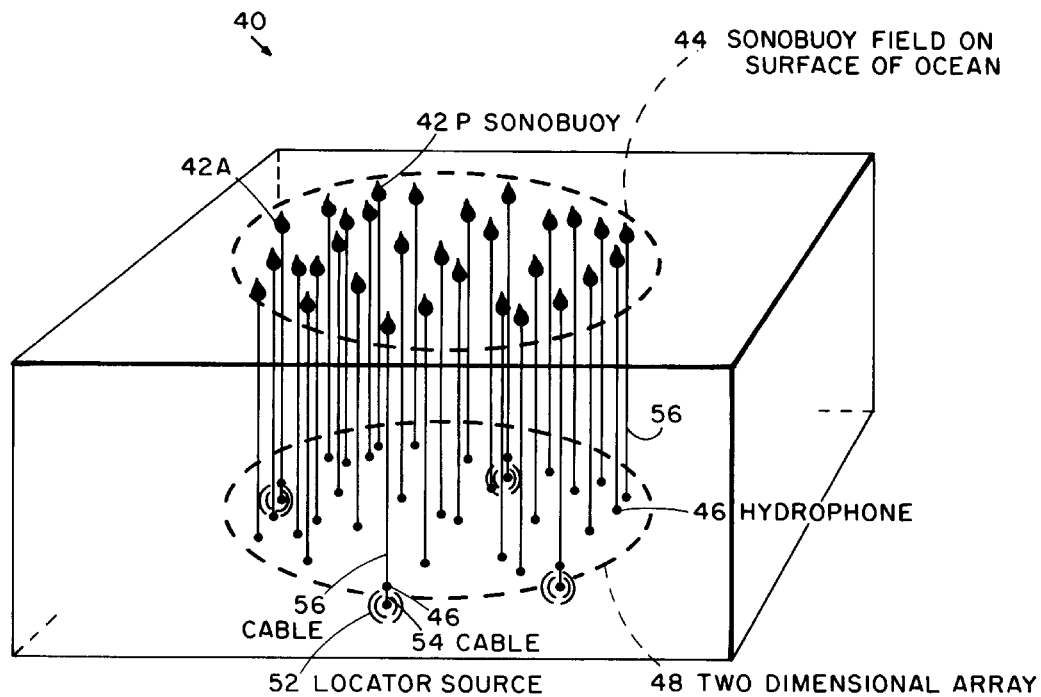
FIG. 3 RANDOM SONOBUOY ARRAY, SHOWN IN GREATER DETAIL IN FIG. 12.
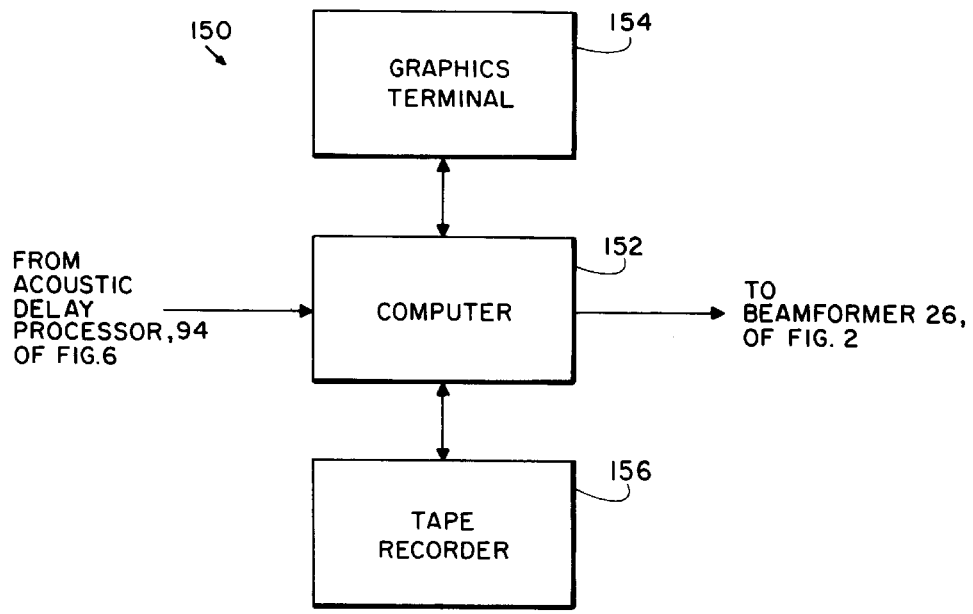
FIG. 10 INTERCONNECTION OF POSITION TRACKER HARDWARE.

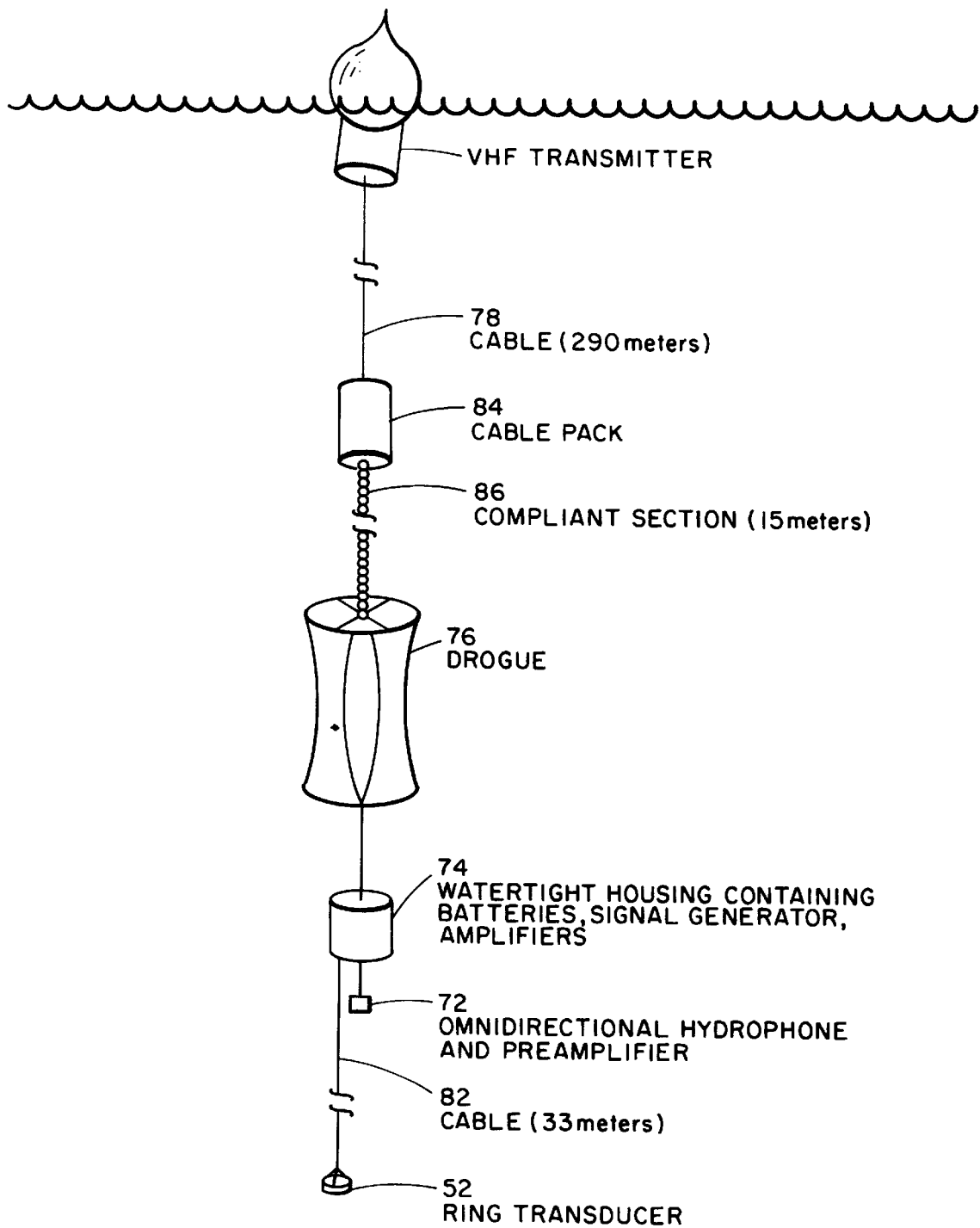
FIG. 5 AN/SSQ-53A SONOBUOY MODIFIED TO PRODUCE ELEMENT-LOCATING SIGNALS.

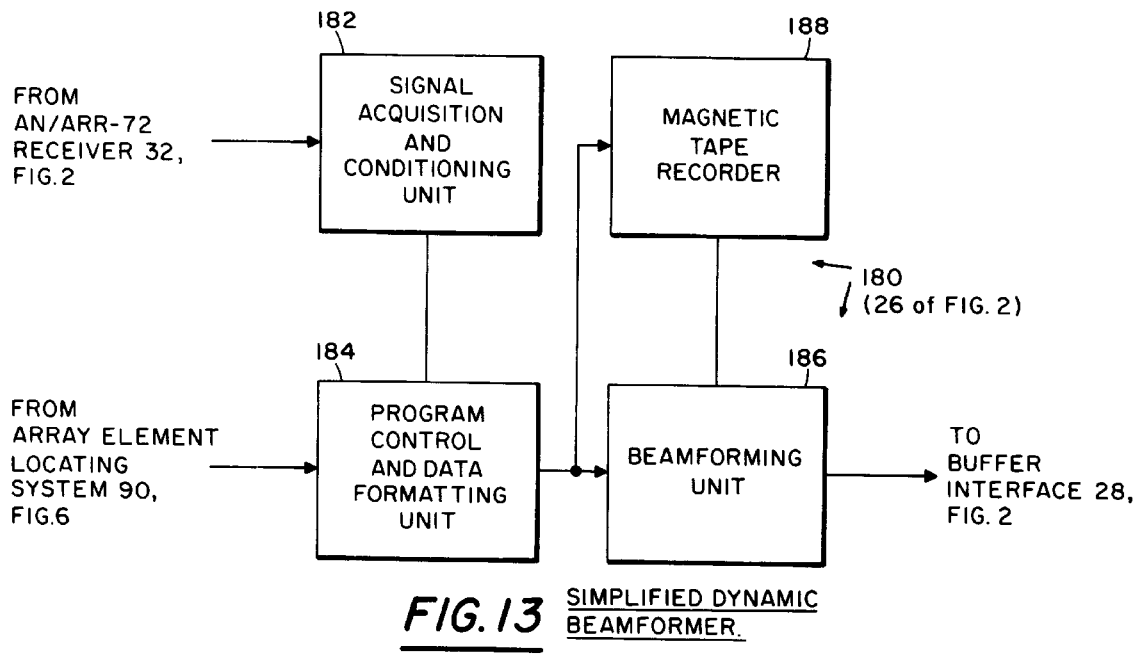
FIG. 13 SIMPLIFIED DYNAMIC BEAMFORMER.
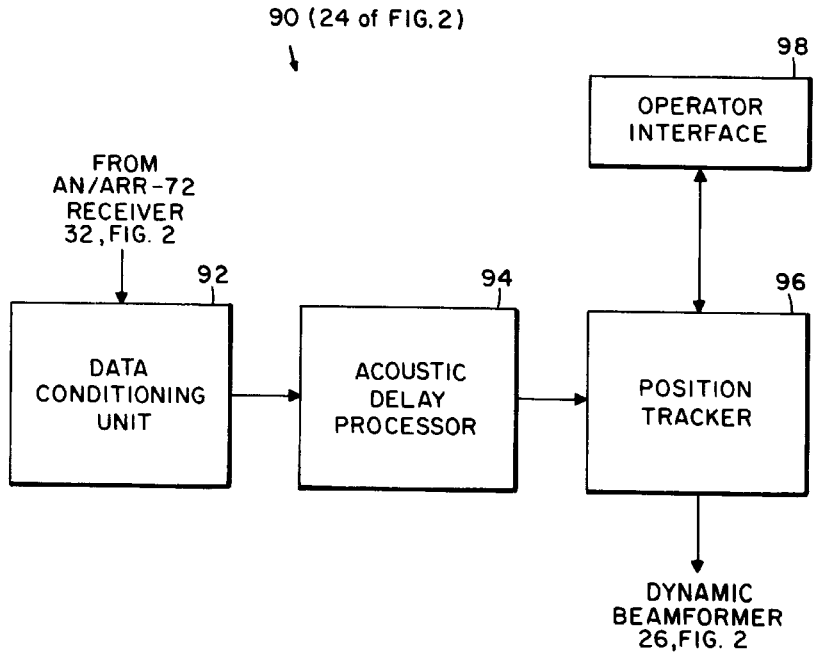
FIG. 6 SIMPLIFIED ARRAY ELEMENT LOCATING SYSTEM.

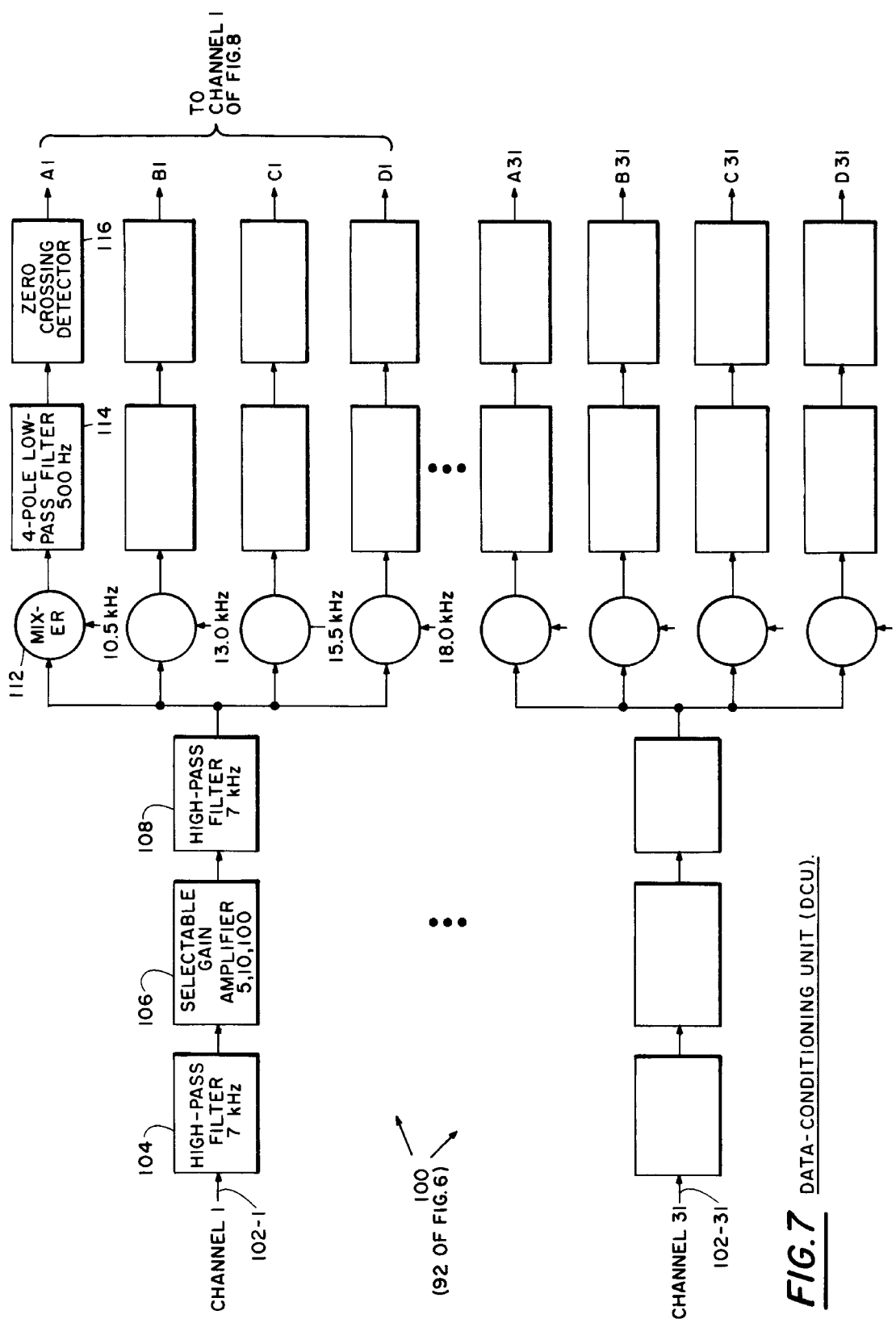
FIG. 7  DATA-CONDITIONING UNIT (DCU).

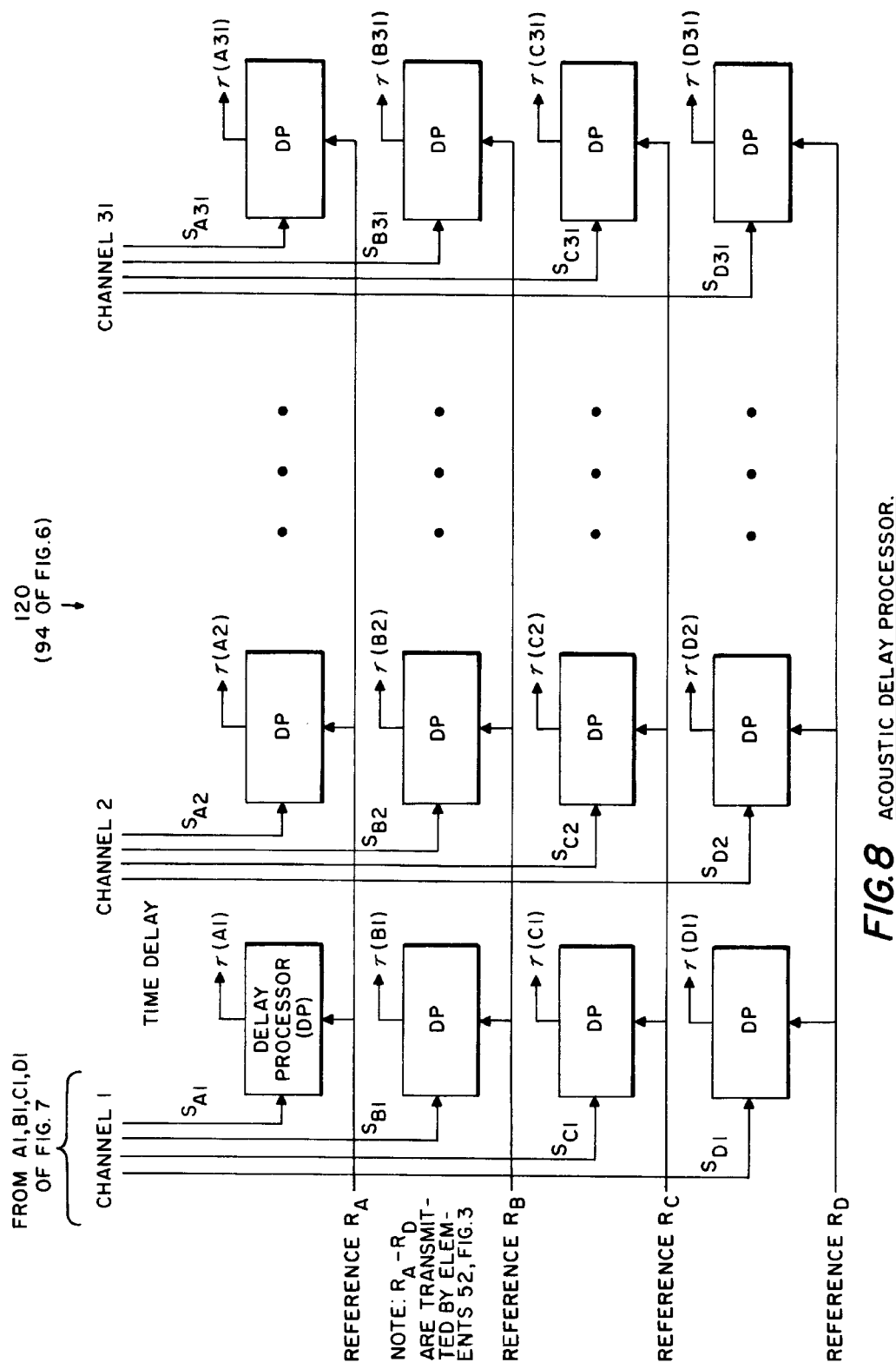
FIG.8  ACOUSTIC DELAY PROCESSOR.

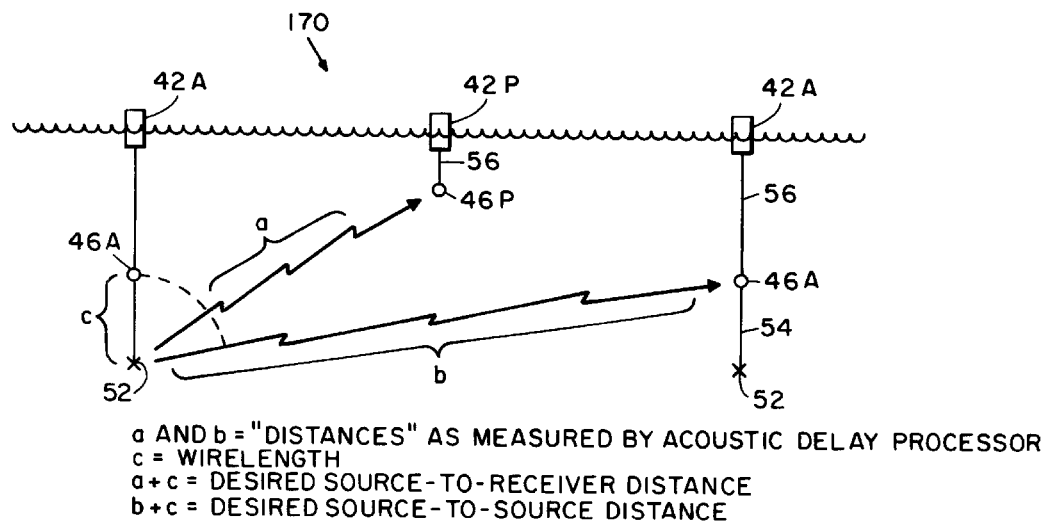
a AND b = "DISTANCES" AS MEASURED BY ACOUSTIC DELAY PROCESSOR
c = WIRELENGTH
a+c = DESIRED SOURCE-TO-RECEIVER DISTANCE
b+c = DESIRED SOURCE-TO-SOURCE DISTANCE
FIG. 12  MEASURED AND ACTUAL INTERELEMENT DISTANCES. SEE FIG. 3 FOR 3-DIMENSIONAL VIEW.
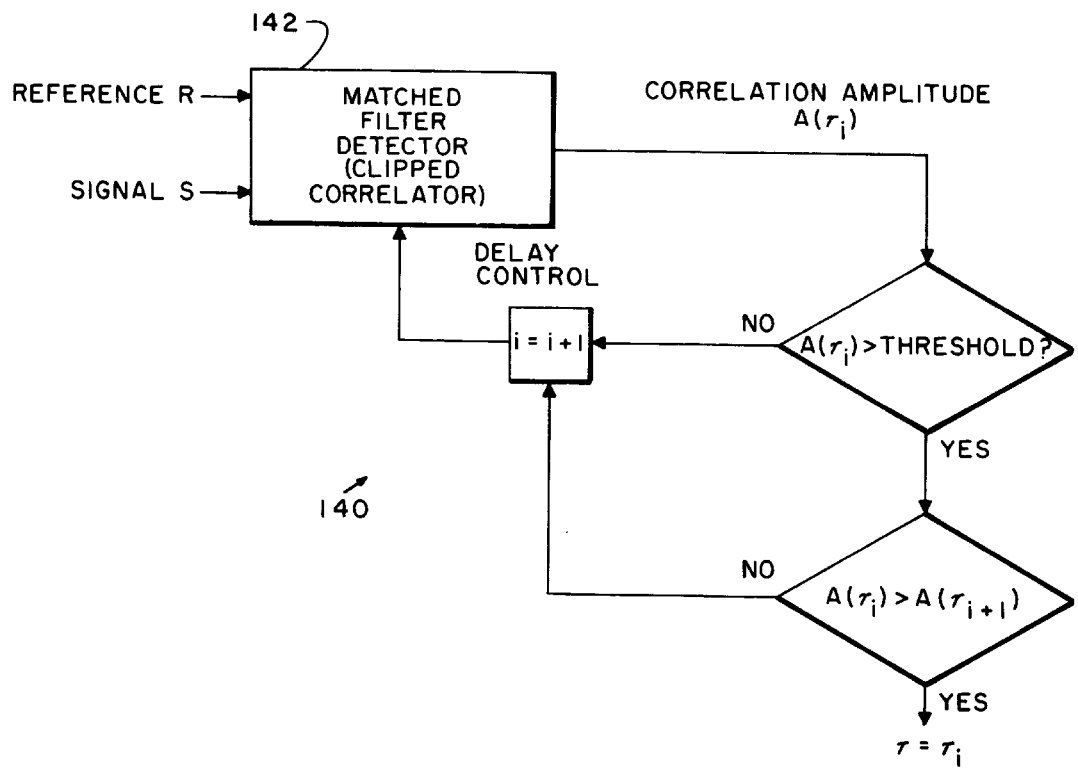
FIG. 9  FUNCTIONAL BLOCK DIAGRAM OF DELAY PROCESSOR (DP) MODULE.

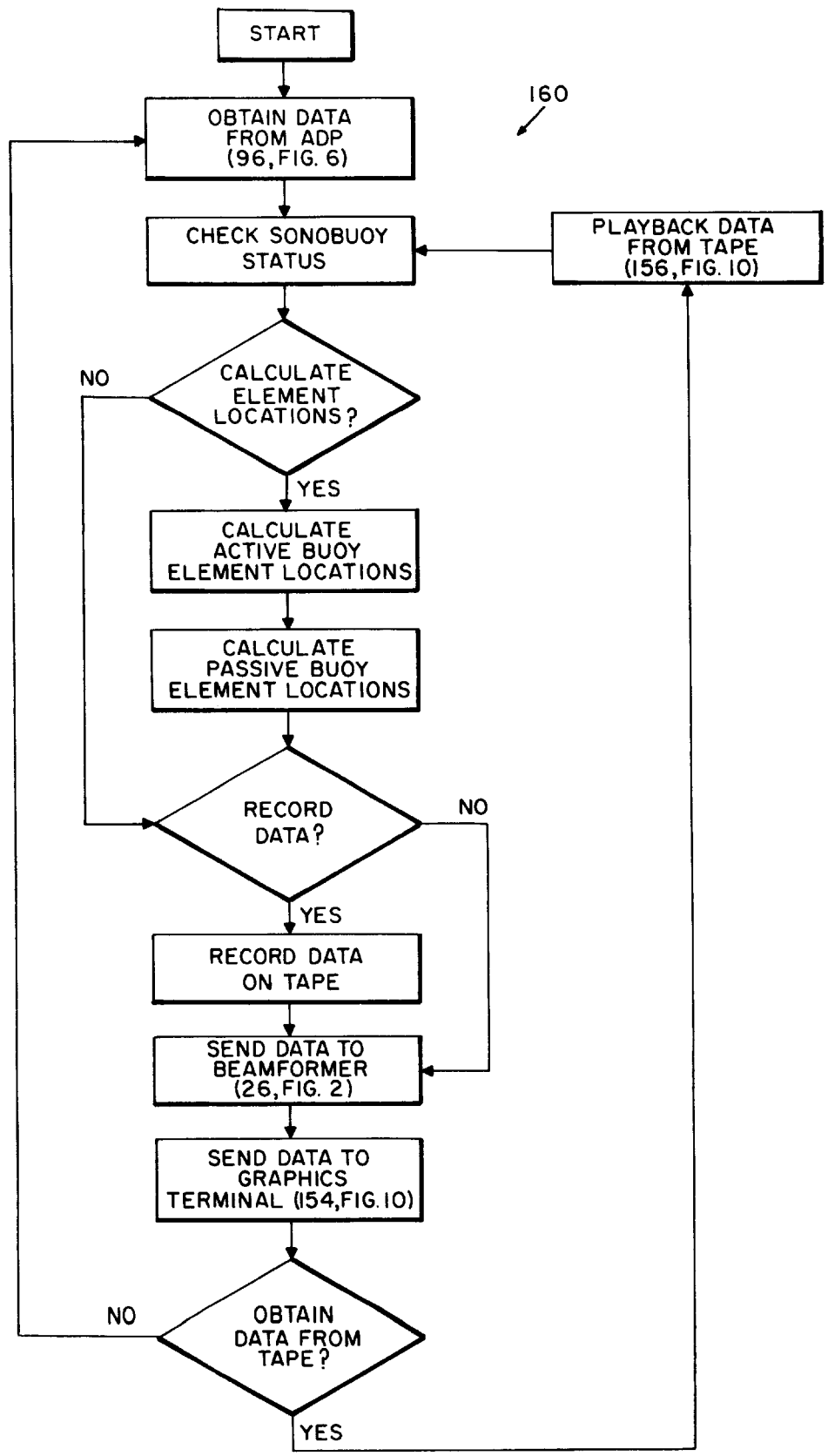
FIG. 11  FUNCTIONAL FLOW DIAGRAM OF POSITION TRACKING ALGORITHM.

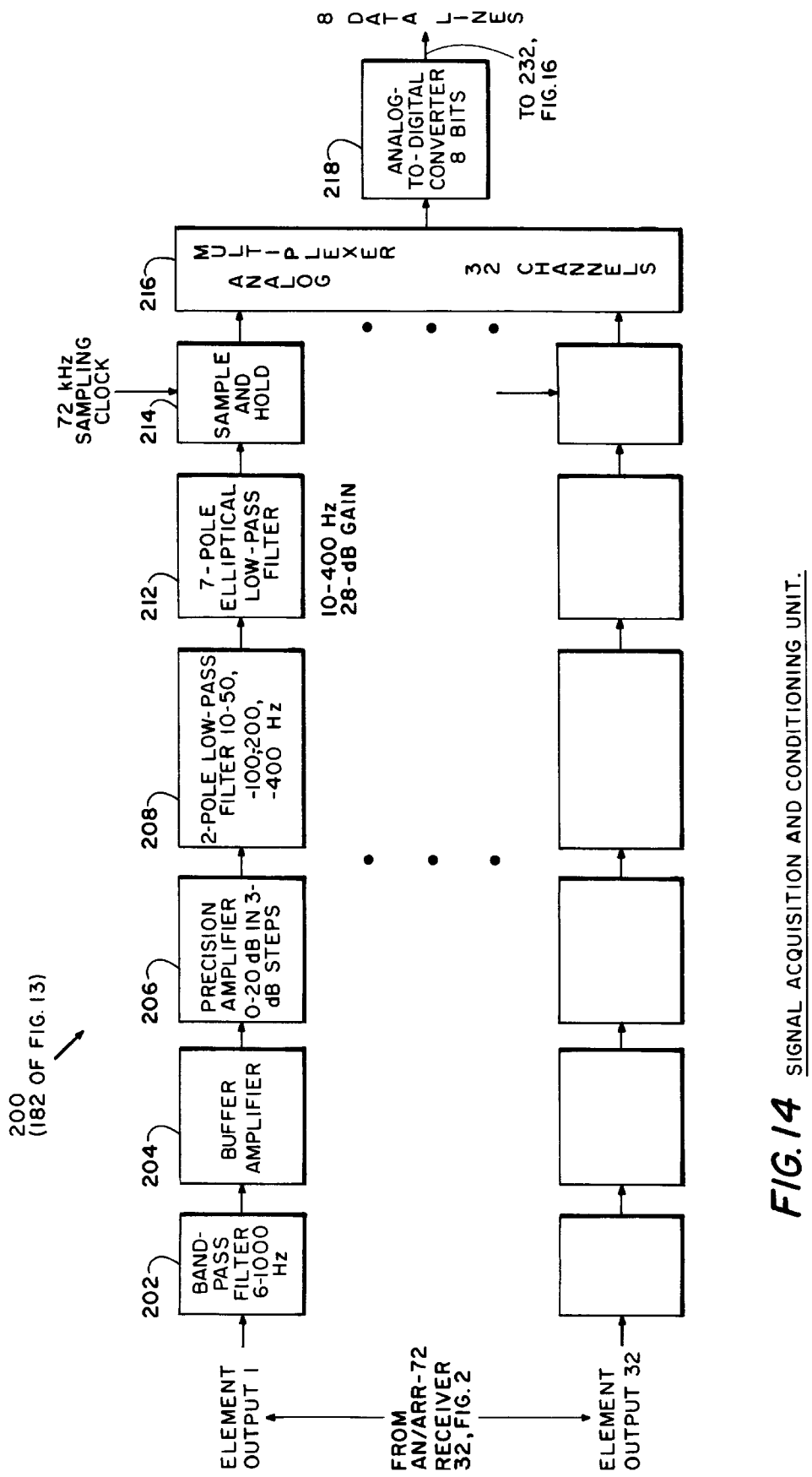
FIG. 14  SIGNAL ACQUISITION AND CONDITIONING UNIT.

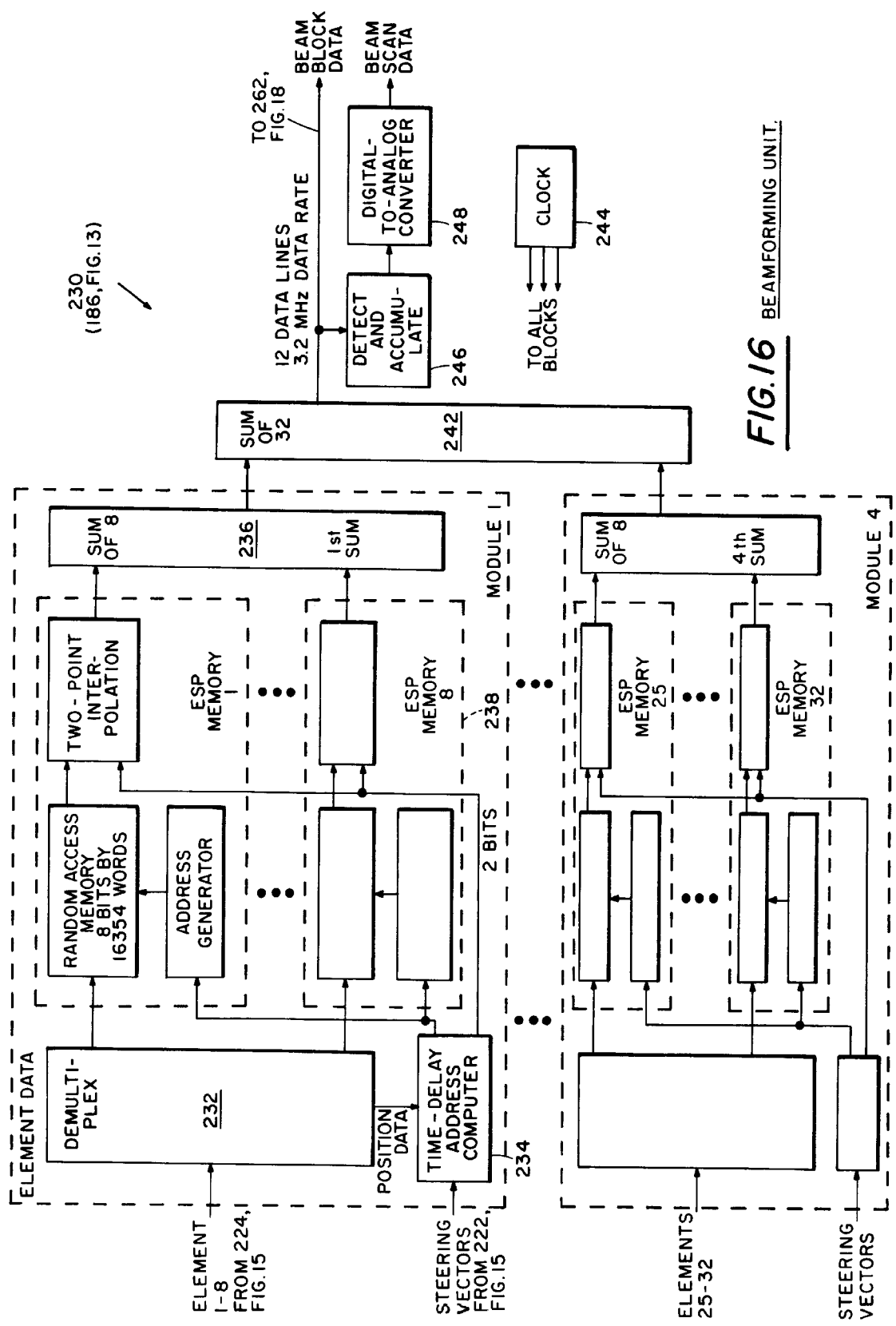

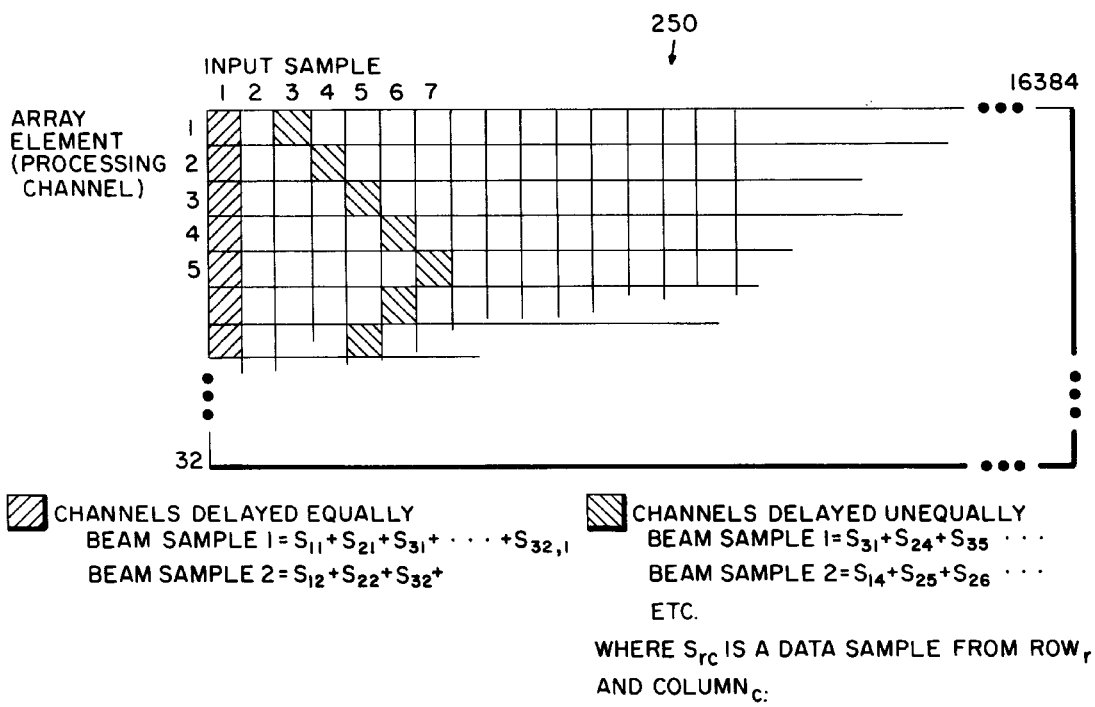
FIG. 17  DATA STORAGE AND BEAMFORMING FUNCTION.
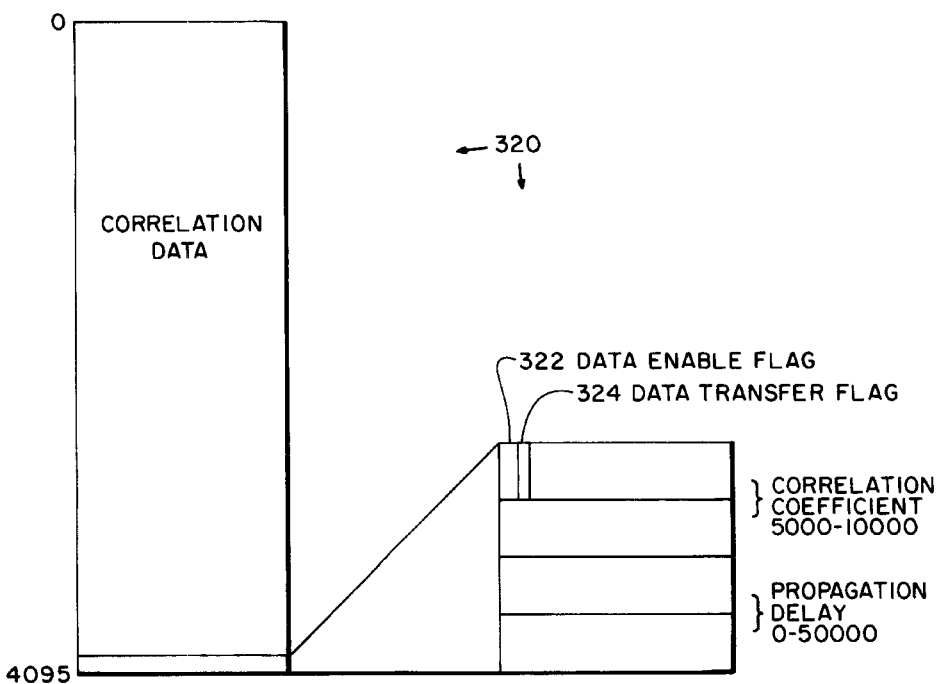
FIG. 21  CONTROL MEMORY ORGANIZATION.

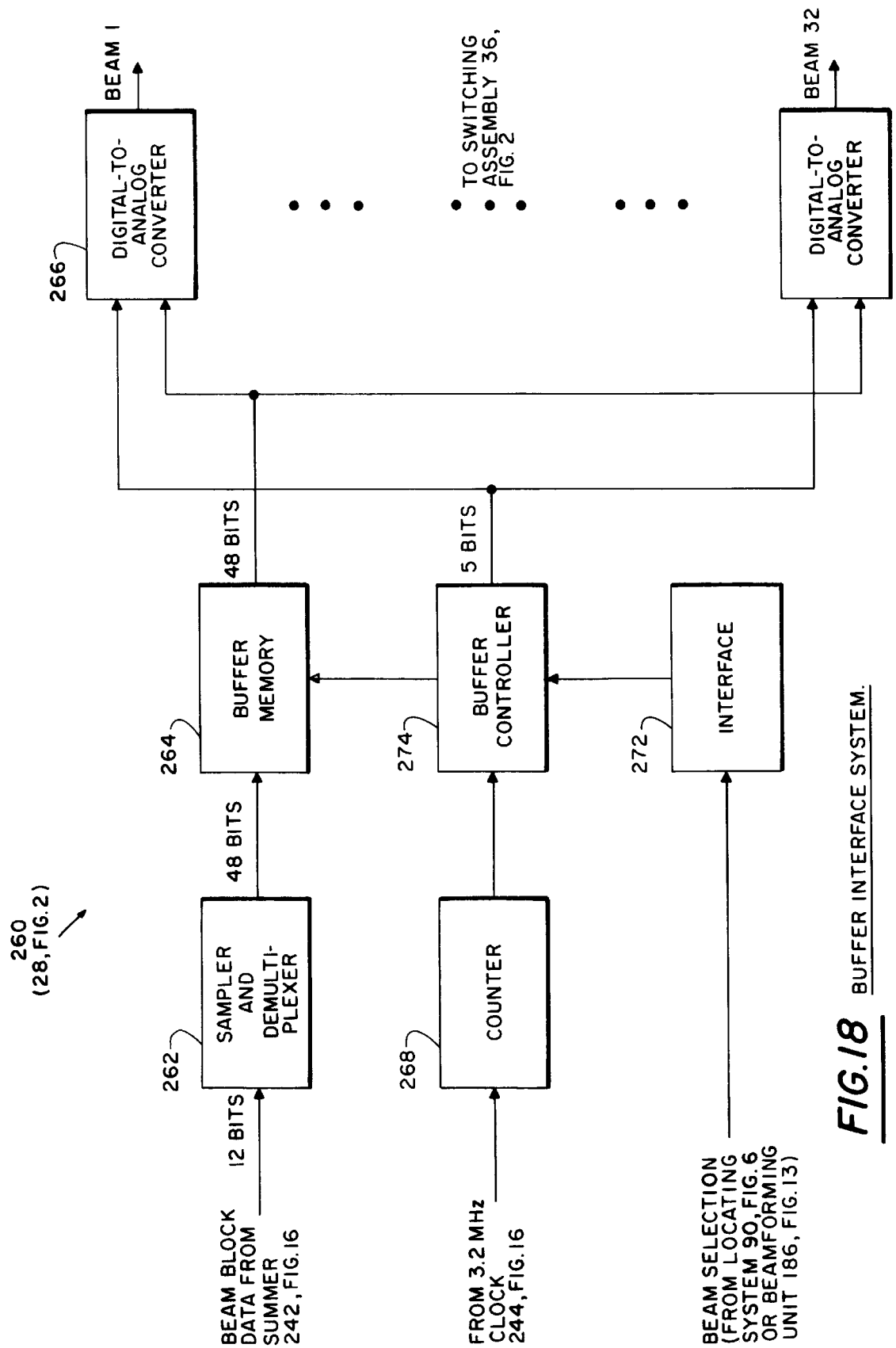
FIG. 18  BUFFER INTERFACE SYSTEM.

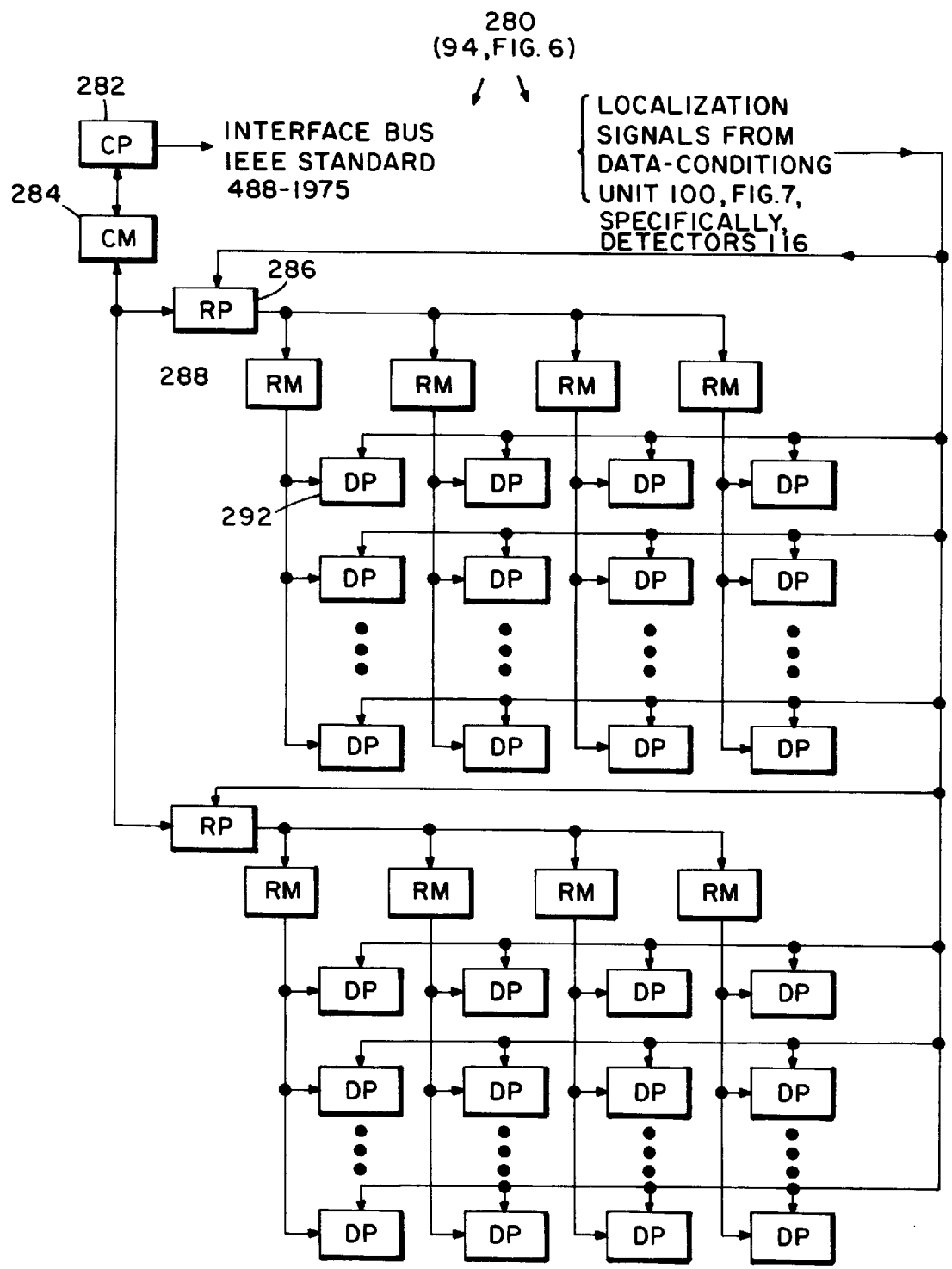
FIG. 19  ACOUSTIC DELAY PROCESSOR STRUCTURE.

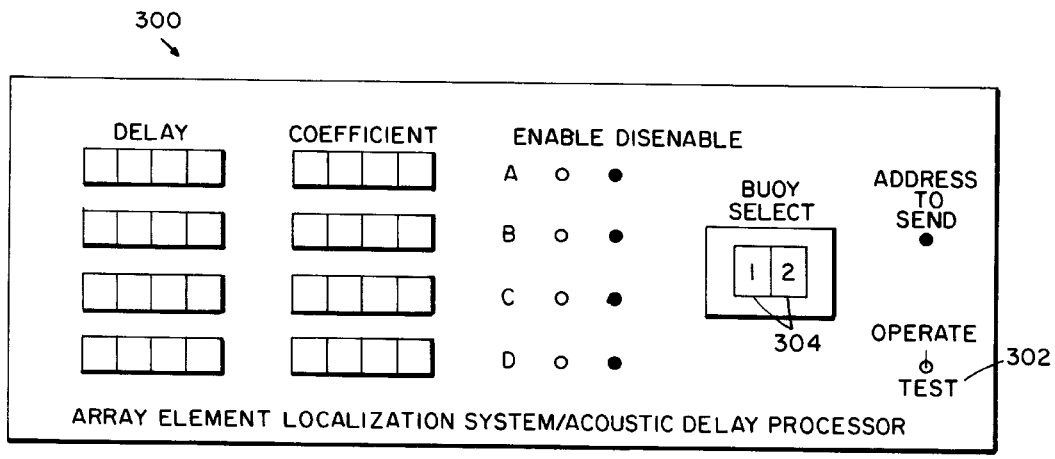
FIG. 20 FRONT PANEL.
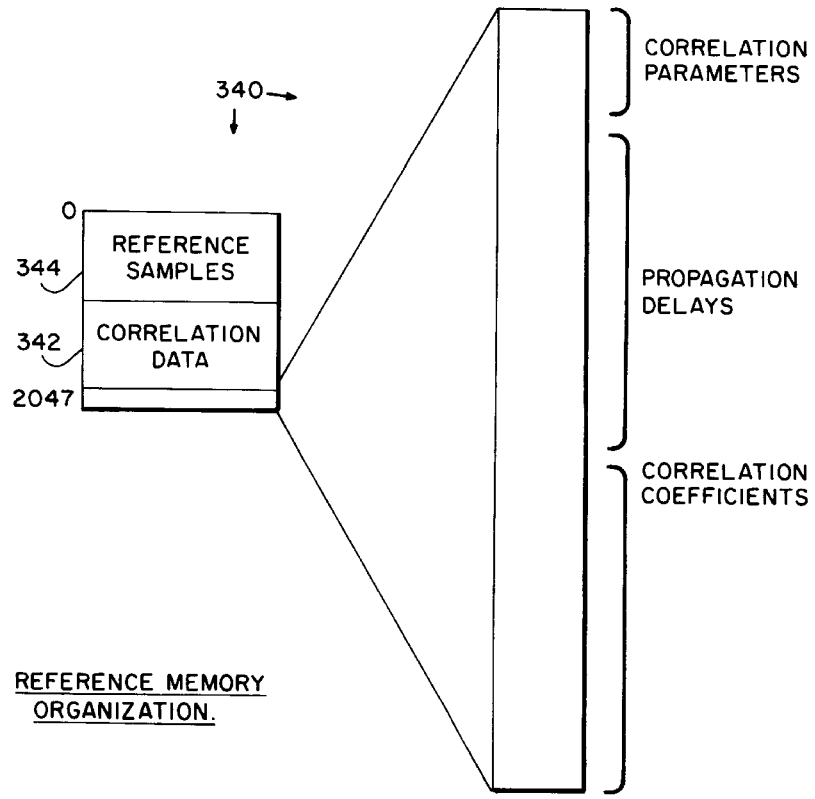
FIG. 22 REFERENCE MEMORY ORGANIZATION.

ACOUSTIC SURVEY TECHNIQUE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The objective of passive acoustic systems designed for undersea surveillance and antisubmarine warfare (ASW) is to detect target-radiated acoustic signals in the presence of complex noise fields. The most advanced systems of this type today employ a combination of temporal gain achieved through narrowband signal-processing, and spatial gain, achieved through linear hydrophone arrays, to obtain a high level of performance. If it be true that the gains achievable through these means are now approaching a practical limit, then further improvement and performance will have to be obtained through other means, such as the use of multi-dimensional arrays.

The invention herein disclosed resulted from an effort to develop the technology required to form thinned planar and volumetric hydrophone arrays from fields of randomly placed, freely drifting, sonobuoys. The use of sonobuoys is intended to minimize the cost of such arrays, formerly thought to be prohibitive. It also allows the arrays to be readily deployed from a mobile platform, such as a long-range aircraft.

There are two basic issues that had to be resolved to demonstrate the feasibility of the random array concept. The first is whether the positions of the individual sensors of the array can be determined with sufficient accuracy for beam-forming purposes. The second issue is whether the rate of dispersion of the sensors is sufficiently low to allow the array to be operated for a useful period of time. These two issues have been resolved satisfactorily.

SUMMARY OF THE INVENTION

The array comprises thinned planar and volumetric hydrophone arrays formed from fields of randomly placed, freely drifting, sonobuoys. Because of the random spacing of the hydrophone, a specific implementation of the invention involves a system for precisely locating the elements of a randomly dispersed array of the elements.

The system comprises a data conditioning unit, for receiving high-frequency element locating signals from a radio receiver, which would generally be located on an aircraft. The data conditioning unit processes these signals so that they are quantized at the output of the conditioning unit.

An acoustic delay processor, whose input is connected to the output of the data conditioning unit, correlates a reference signal received from an active element suspended from a sonobuoy with a corresponding received signal from another element, which may be active or passive, suspended from another sonobuoy.

A position tracker, whose input is connected to the output of the acoustic delay processor, calculates the relative position of each element of the random array from the propagation delays measured by the acoustic delay processor.

OBJECTS OF THE INVENTION

An object of the invention is to provide a sonar array wherein the transducer elements are free-floating and can move in an unrestrained manner with respect to each other.

Another object of the invention is to provide a sonar array utilizing a relatively small number of submerged active transducers which permit determining the relative locations of all the relatively larger number of passive transducer elements.

Yet another object of the invention is to provide a two-dimensional random array which is capable of discriminating against noise in all horizontal directions.

Still another object of the invention is to provide a random array wherein the gain of the array is not as severely constrained by aperture as that of a line array.

These and other objects of the invention will become more readily apparent from the ensuing specification when taken together with the drawings.

BRIEF DESCRIPTION OF THE DRAWINGS

FIG. 1 is a schematic diagram of a two-dimensional random sonobuoy array with a typical beam pattern.

FIG. 2 is a simplified block diagram of the sonobuoy thinned random array system of this invention.

FIG. 3 is a diagrammatic view of the random sonobuoy array as it would be disposed in the ocean in use.

FIG. 4 is a computer-generated plot of a uniform random distribution of 31 elements over a circular area 1200 feet in diameter.

FIG. 5 is a diagrammatic view of an AN/SSQ-53A sonobuoy, used in this invention, but modified to produce element-locating signals.

FIG. 6 is a simplified functional block diagram of the array element locating system of this invention.

FIG. 7 is a block diagram of a data-conditioning unit.

FIG. 8 is a block diagram of an acoustic delay processor.

FIG. 9 is a functional block diagram of a delay processor module (DP), one of many such modules comprising the acoustic delay processor shown in FIG. 8.

FIG. 10 is a block diagram showing the inter-connections of the position tracker hardware.

The circuits shown in FIGS. 7, 8 and 10 comprise basic elements of the array element locating system shown in FIG. 6.

FIG. 11 is a functional flow diagram of the position tracking algorithm, used to calculate the locations of the active and passive transducer elements.

FIG. 12 is a diagrammatic view of a section of the ocean showing the measured and actual inter-element distances between the active and passive elements. In a sense, it is a cross-sectional view of the three-dimensional view shown in FIG. 3.

FIG. 13 is a simplified block diagram showing the dynamic beamformer of FIG. 2 in more detail.

FIG. 14 is a block diagram of the signal acquisition and conditioning unit.

FIG. 15 is a block diagram of the program control and data formatting unit.

FIG. 16 is a block diagram of the beamforming unit.

FIGS. 14, 15 and 16 show in more detail the system shown in FIG. 13.

FIG. 17 is a graph showing the data storage and beam-forming function.

FIG. 18 is a block diagram showing the buffer interface system, shown in FIG. 2.

FIG. 19 is a block diagram illustrating the acoustic delay processor structure.

FIG. 20 is a diagrammatic view of the front panel of the array element localization system/acoustic delay processor.

FIG. 21 is a schematic diagram showing the control memory organization.

FIG. 22 is a schematic diagram showing the reference memory organization.

DESCRIPTION OF THE PREFERRED EMBODIMENTS

The random sonobuoy array is a fairly new concept in acoustic arrays for undersea surveillance and anti-submarine warfare (ASW) applications. As will be discussed in more detail with reference to FIG. 3, the array consists of a number of sensors suspended from a field of sonobuoys deployed over a circular area on the surface of the ocean. The distribution of sensors is random and "thinned"; that is, the spacing between sensors vary randomly, and on the average is much greater than one half wave length at the principal frequency of interest. If a single sensor is suspended from each sonobuoy, the result is a two-dimensional or nearly two-dimensional planar array in the shape of a thin horizontal disk. If a vertical line array of sensors is suspended from each sonobuoy (or if a single sensor is suspended at various depths, the result is a three-dimensional or volumetric array in the shape of a thick horizontal disk.

In the early investigations of random thinned arrays, it was shown that the resolution (with a main beam) is primarily a function of aperture and operating frequency, while average side-lobe level (gain against noise) is primarily a function of the number of sensors. Thus aperture can be independently chosen to provide the resolution desired at the principal operating frequency, and a number of sensors can be independently chosen to provide the gain desired. The decoupling of gain and aperture is a consequence of the fact that average spacing between sensors is greater than required to achieve independent sampling of the noise field. It should be noted that the grating lobes normally associated with thinned arrays are prevented from forming by the a periodic distribution of sensors. It should be further noted that, since the array is not tuned to a particular frequency by the spacing of its sensors, gain can be held constant or nearly constant over an extended band of frequencies. This is discussed by Y. T. Lo, "A Mathematical Theory of Antenna Arrays with Randomly Spaced Elements," IEEE Transactions on Antennas and Propagation, vol. AP-12, May 1964.

It will be instructive to compare the properties of a thinned two-dimensional random sonobuoy array with those of a conventional line array. Let it be assumed that each array has the same aperture. The position of the sensors of the random array is assumed to be determined by an active acoustic locating system, the subject of this invention. The sensors of the line array are placed at fixed intervals along a flexible cable in the normal manner.

First the beam patterns of the random disk array will be compared with those of the line array and with the observed directional characteristics of ambient noise in the ocean. For this purpose, a two-dimensional random sonobuoy array 12 positioned in the deep ocean is illustrated schematically in FIG. 1. In the plane 14 of the array 12 a single pencil-like beam 16 is formed at all azimuths. Away from the plane of the array 12, as is shown in the FIG., identical upward- and downward-looking beams, 16U and 16D, are formed. With addition of vertical aperture, the mirror beams 16U and 16D tend to disappear and a single beam is formed at all azimuths and elevations. Because of the array's circular symmetry, horizontal resolution is uniform. Vertical resolution is the same as horizontal resolution in the direction perpendicular to the array's plane, that is broadside, and decreases as one moves toward the direction of the plane of the array, that is edgefire.

Approximations for the dimensions of the beam are as follows:

Broadside resolution=$\lambda/D$ radians (1B)

Edgefire resolution=$2(\lambda/D)^{1/2}$ radians (1E)

where $\lambda$ is wavelength and D is aperture (diameter). Thus at 150 Hz an array with an aperture of 366 meters (1200 feet) would have a broadside beam with a circular cross section of 1.6 by 1.6 degrees and an edgefire beam with an oval cross section of 1.6 by 19 degrees.

It can be shown that the beam patterns of the horizontal disk array are more suitable for discriminating against ambient noise background in the ocean than are those of the line array. A two- or three-dimensional disk array is capable of discriminating against noise in both the horizontal and vertical directions. A one-dimensional line array, by contrast, is capable of discriminating against noise only in the horizontal direction, except at endfire. The random disk array further provides the same discriminations at all horizontal angles, while the line array produces an increasingly wider beam as it is steered from broad-side toward endfire.

With respect to the directivity index, that is gain against isotropic noise, of the two arrays as a function of aperture and number of sensors, the gain of a line array is limited by its length; that is, gain can be increased only by a proportionate increase in length. On the other hand, it can be shown that the gain of the random disk array is not as severely constrained by aperture as that of the line array. The reason is that the sensors are distributed over two dimensions instead of one.

FIG. 2 shows a simplified functional block diagram of an experimental system 20 that was actually built. The system 20 includes a sensor-locating subsystem 24 designed to determine the position of the individual sensors of a freely drifting array in real time with sufficient accuracy to form beams at 400 Hz. The use of such a system 24, together with the thinning of the array to minimize the loss of acoustic independence among the sensors, is expected to lead to array gains within one dB of theoretical. The use of sonobuoys coupled hydrodynamically to the more stable currents and conditions of the deep ocean is further expected to lead to useful array lifetimes of up to 24 hours and greater.

The random array system 20 consists basically of a random array 22 formed with thirty-one modified production sonobuoys; a special array element locating system 24 which uses active acoustic techniques to determine the relative position of the array's receiving elements; and a dynamic beamformer 26 capable of generating up to 1,600 preformed beams.

The system 20 is designed to be deployed by a P-3C antisubmarine patrol aircraft and to make use of the aircraft's AN/ARR-72 radio telemetry receiver 32, and AN/AQA-7 narrowband analyzer and display 34. The receiver 32 is manufactured by General Dynamics Electronics, of San Diego, Calif., whereas the analyzer 34 is manufactured by the Magnavox Corp.

Acoustic data from the sonobuoys 22 are transmitted to the aircraft via the receiver 32. These data consist of both high-frequency acoustic signal generated within the array and the low-frequency acoustic signals from external sources. The received data are routed to the locating system 24, where the high-frequency signals are extracted and processed to determine the position of the receiving elements of array 22. The position coordinates of each element are then routed to the dynamic beamformer 26 and used to coherently process the low-frequency signals. The 1600 separate beam formed outputs are sent to a special buffer interface 28, where 32 are selected and routed back into the data-processing system of the P-3C aircraft for analysis and display. Up to eight beams at a time can be processed and displayed by the analyzer 34 while another eight can be processed by an automatic line integrator.

The random sonobuoy array 40, shown in FIG. 3, is formed with thirty-one modified AN/SSQ-53A sonobuoys 42 distributed over circular area 44 on the surface of the ocean. Each sonobuoy 42 deploys a passive wide-band hydrophone 46 at a depth of 305 meters (1,000 feet), resulting in a two-dimensional, disk-shaped array 48 of thirty-one receiving element 46.

Four of the sonobuoys 42 also deploy a low-power active acoustic source 52 which continuously transmits high-frequency band-limited, pseudorandom, noise at an individual center frequency of $f_c$=10.5, 13.0, 15.5, and 18.0 kHz, with a bandwidth W=1,000 Hz. The active sources 52 are suspended below the hydrophones 46 and their respective sonobuoys 42 by a cable 54 of known length. The high-frequency signals are used by the locating system 24, FIG. 2, to determine the relative position of each of the thirty one receiving elements, 46 of FIG. 3.

The initial diameter or aperture of the array 48 is approximately 366 meters (1,200 feet). This diameter 48 gradually increases with time as the sonobuoys 42 disperse under the effects of wind and currents. The useful lifetime of the array is thus a function not only of the battery lifetime of the sonobuoys but of the range of detection of the locating system 24, FIG. 2. Preliminary estimates of the sonobuoy dispersion rate indicate that a range of approximately 1675 meters (6,000 feet) should deal a useful array lifetime of 24 hours or longer. This result has been confirmed by sea tests.

The distribution of the elements 46 of the array 20, FIG. 2, is uniformly random and "thinned"; that is, the spacing between the elements varies randomly and on the average is much greater than one-half wavelength at the principal operating frequency. A sample distribution 60 of thirty one elements 62 to form a planar array with an aperture of 366 meters (1,200 feet) is shown in FIG. 4. The number of elements 62 required to "fill" an array of this size—that is, the number required with normal half-wavelength spacing—would be approximately 4,800 at 150 Hz. Thinning of the array 60 in this manner tends to insure that few or none of the randomly spaced elements 62 will lose acoustic independence or become entangled with another element.

Modern ASW sonobuoys are inexpensive, readily available, and quiet. They are able to operate without self-induced noise at frequencies as low as 5 Hz in 15-foot seas, and to detect submarines at relatively long ranges in the open ocean. An array of such sensors thus offers the potential for increasing detection range in proportion to the number of sensors used.

Reference is now directed to FIG. 5. The AN/SSQ-53A sonobuoy 70 was chosen for the array of this invention for three reasons. First, it had a sensor 72 deployable to a depth of 305 meters (1,000 feet) assuring good acoustic coupling with long-range signal propagation paths. Second, it provided water tight housing 74, also deployable to 305 meters, with sufficient room to hold the batteries and circuitry associated with the four active sources, 52 of FIG. 3. Finally, it deployed a large drogue 76, FIG. 5, just above the hydrophone 72. This drogue 76 was designed to isolate the hydrophone 72 from cable 78 strumming and to decouple it from noise-inducing surface wave motion. It is believed that the drogue 76 also tends to couple the sonobuoy 70 hydrodynamically to the slower, more uniform, deep ocean currents and to prolong the life of the array by slowing the rate of sonobuoy dispersion (refer back to FIG. 4).

Two modifications of the sonobuoy 70, FIG. 5, were required to adapt it to the requirements of this invention. The first was replacement of the normal DIFAR hydrophone with a calibrated omnidirectional hydrophone with a relatively flat response up to 20 kHz. The extended receiving band allows detection of the high-frequency signal generated by the active sources within the array, while the use of a calibrated hydrophone 72 reduces signal loss during beamforming. The hydrophone 72 selected was that normally used on the AN/SSQ-57 A sonobuoy.

Reference is now directed back to FIG. 3. The second modification to the sonobuoy which was required was the addition of the active source and associated circuitry 52 to four of the thirty one sonobuoys 42. The source 52, shown as a ring transducer 52 in FIG. 5, is a free-flooding cylindrical ring three inches in diameter and 1½ inches long, suspended by a cable 82 approximately thirty-three meters below the passive hydrophone 72. This separation was required by the locating system, 24 in FIG. 2, to provide a vertical measurement base line for determining the depth of hydrophones 72, FIG. 5. It also helped to reduce the dynamic range requirement of the receiving electronics. The dynamic range requirement was further reduced by the use of the ring transducer 52, which produces a dipole radiation pattern with a fifteen-dB null steer toward the hydrophone 72.

The array element locating system, shown as circuit 24 in FIG. 2 and by reference numeral 90 in FIG. 6, will now be discussed in great detail.

To form and properly phase an array of sonobuoys one must know the relative position coordinates of each sensor in the array. The sensors are shown by numeral 46 in FIG. 3 and by numeral 62 in FIG. 4. Errors in the actual positions will cause a loss in signal gain defined by $$\text{Loss} = 10 \log \frac{1 + (N-1)\exp - 8\pi(\Delta/\lambda)^2}{N} \qquad (2\text{A})$$

where N is the number of sensors, Δ is the position error, and λ is wavelength (ref. 11). An error of one-tenth of a wavelength (±λ/10) will thus cause a loss in array gain of 1 dB. This error is considered the maximum acceptable.

Several acoustic techniques are feasible for determining the location of the sensors of a freely drifting random array. One technique is to place broadband transmitters in the immediate vicinity of the array and to measure time-of-arrival differences at the individual sensors. A minimum of three such transmitters is required to provide a three-dimensional estimate of each hydrophone's position.

This situation is discussed by C. Johansen, Naval Ocean Systems Center, San Diego, Calif. 92152, in Technical Note 1573, "Locating Random Hydrophone Array Elements", August 1975. Most of the references useful for understanding the invention described herein are classified, and will not be included herein. The ones that are included are unclassified.

A variation of this method is to measure time-of-arrival differences with broadband transmitters placed in the far-field of the array. In this technique the use of two orthogonal transmitters would allow one to calculate the two hydrophone coordinates most important to cohering signals with similar propagation characteristics. A third approach is to use a target or other distant non-cooperative source to "self-cohere" the array in a single direction of interest. This approach is discussed by B. Steinberg, et al., "Research in Distributed Acoustic Arrays," Valley Forge Research Center, Quarterly Progress Report No. 22, August 1977.

The first of these techniques is the one which has been selected for the invention herein disclosed.

Reference is now directed to FIG. 6, wherein it is illustrated a simplified embodiment 90 of the array element locating system of this invention. The locating system 90 uses active acoustic techniques to provide the position information required to coherently process the outputs of a random sonobuoy array. The system 90 is designed to survey the elements, 46 in FIG. 3, of an array dispersed over an area of up to a mile in diameter with an accuracy of a tenth of a wavelength (0.375 m or 1.2 ft) at 400 Hz and an update rate of approximately 5 seconds.

The locating system 90 consists of three basic components: a data-conditioning unit (DCU) 92, which extracts and quantizes the element locating signals; an acoustic delay processor (ADP) 94, which measures the propagation delay between the active and passive elements of the array; and a position tracker 96, which converts the measured propagation delays to locations in a relative coordinate system. An operator interface 98 associated with the position tracker 96 is used to enter and display appropriate system and processing parameters.

The data-conditioning unit 100, shown in FIG. 7, performs the functions of extracting the high-frequency element-locating signals from the element output spectrum and quantizing them for processing by the delay processor, 94 in FIG. 6. The unit 100, of FIG. 7, consists of 31 identical conditioning channels, one corresponding to each channel of the receiver 32, shown in FIG. 2. The input signal on each channel 102 is first filtered by a simple resistance-capacitance (RC) circuit 104 which eliminates direct-current energy and discriminates against other acoustic energy below 7 kHz at –6 dB per octave. The filtered signal is then passed on to an operational amplifier 106, having a manually selectable gain of 5, 10, or 100. Amplifier 106 allows input signals with various levels to be accommodated without sacrificing dynamic range. After amplification the signals are again filtered, in filter 108, to remove any remaining low-frequency noise.

The filtered and amplified signals are next basebanded, by the four mixers 112, about the four locating system reference frequencies of 10.5, 13.0, 15.5, and 18.0 kHz. The basebanded signals are filtered, by filter 114, to remove energy above 500 Hz. The low-pass filter 114 has a roll-off of 24 dB per octave. The filtered signals are then hard-clipped by means of zero-crossing detector chips 116. These chips 116 quantize the 500-Hz band into transistor-transistor logic (TTL) levels for processing by the acoustic delay processor 94, of FIG. 6. Hard-clipping was chosen to minimize the amount of hardware needed to perform the 120 parallel correlation operations. The expected high input signal-to-noise ratio was considered sufficient to compensate for the 2 dB loss that accompanies this type of processing.

When the full 31 sonobuoys, 42 in FIG. 3, are used in the array, 4 by 31 or 124 basebanded signals, designated "A1" through "D31", are generated by the data-conditioning unit 100. Of these signals, four represent signals transmitted and received by the same buoy and are used as references in the correlation operation.

Reference is now directed to FIG. 8, wherein is illustrated the acoustic delay processor 120 used with the locating system, 90 in FIG. 6. The delay processor consists of 120 identical matched-filter detectors 122, called "delay processors" (DP), each of which correlates a reference signal R, more specifically designated as $R_A$, $R_B$, $R_C$, and $R_D$, from an active sonobuoy with the corresponding received signal, $S_A$, $S_B$, $S_C$, or $S_D$, from another active or passive sonobuoy. Since the signals from the four-active buoys, from which are suspended the locator sources 52, are not correlated with themselves, there are 120 rather than 124 delay processors for the 31-element random array.

A functional block diagram of an individual delay processor and its associated logic 140 is shown in FIG. 9. The quantized input signals from the data-conditioning unit, 100 in FIG. 7, are clocked into the processor 140 through 5-kHz sample-and-hold circuits. The sample-and-hold circuit is not shown explicitly in FIG. 9, but is assumed to be included in matched filter detector 142. Blocks of data one thousand samples or 200 milliseconds long are then correlated by the following method.

Beginning with a time delay τ of zero, the delay processor 142 successively compares older blocks of reference signal R with newly received delayed signals S until a persistent correlation is found that exceeds a selectable threshold. The search procedure can be expressed as $$A(\tau_i) = \sum_{t=0}^{T} R(t - \tau_i)S(t), \quad (2B)$$

where $A(\tau_i)$ is the amplitude of the correlation at trial delay $\tau_i$ and T is the period of the correlation. If the amplitude exceeds the threshold, the signals are compared at the next delay to insure that the peak amplitude has been reached. If it has, the delay τ corresponding to the peak is set equal to $\tau_i$. Otherwise the signals continue to be compared at successive delays until the peak is found.

If no correlation is found that meets the amplitude and persistence requirements programmed into the delay processor's firmware, the trial delay $\tau_i$ increases one sample at a time to the limit $i_{max}$ of the reference memory. Since $i_{max}$ is equal to 8192, the maximum time delay is given by $\tau_{max}$=8192×200 microseconds=1.6384 seconds.

At a sound speed of 1500 meters per second this value corresponds to a maximum detectable buoy separation of approximation 2450 meters (8040 ft). Once the entire reference memory has been searched the process begins again with $\tau_i=\tau_0$.

Assuming that the correlation peak can be detected, the individual propagation delay measurements are accurate to the reciprocal of the bandwidth of the locating signals. A further improvement in accuracy can be achieved by averaging several measurements. Detection of a well-defined correlation peak is assured by using a bandwidth of 1000 Hz and an integration time of 200 milliseconds. This bandwidth and integration time give a processing gain of approximately 24 dB for the digital matched-filter detector modules.

The detailed design and operation of the ADP are described hereinbelow in appendix A. An analysis of the ADP's accuracy in terms of signal bandwidth, averaging time, and signal-to-noise ratio is provided in appendix B.

The position tracker 150, FIG. 10, is an implementation of a software algorithm that calculates the relative position of each element of the random array from the propagation delays measured by the acoustic delay processor, 120 of FIG. 8. The calculated element locations are sent to the beamformer 26, FIG. 2, with appropriate beam-steering directions for use in coherently processing the low-frequency element outputs. The algorithm was implemented on a Data General Nova 800 minicomputer 152 used in conjunction with a Hewlett-Packard HP 2648A graphics terminal 154 and a Kennedy 9700 digital tape recorder 156.

The graphics terminal 154 provides a means of selecting the desired processing parameters and displaying the calculated element locations and other data. The tape recorder 156 provides a means of recording the calculated element locations and the associated propagation delays for subsequent playback and analysis. The interfaces for the terminal 154 and recorder 156, as well as those for the acoustic delay processor 94, FIG. 6, and beamformer 26, FIG. 2, are mounted in the minicomputer 152.

A functional flow diagram indicating the major software routines of the position tracking algorithm is shown in FIG. 11. Execution of the algorithm begins with a command entered through the graphics terminal 154, FIG. 10, and proceeds automatically unless the operator intervenes to change a processing parameter. The parameters under operator control, described hereinbelow, include beamformer steering angles, direction of true north, and display content and format. Choices for all selectable processing parameters are specified by the software in the absence of an operator input.

The algorithm is designed to operate primarily on data received directly from the acoustic delay processor 94, FIG. 6. As the data arrive they are decoded, sequenced, and stored in memory. Missing data ae noted and appropriate status indication displayed on the graphics terminal 154, FIG. 10. The relative locations of the receiving elements on the active and passive sonobuoys, 42A and 42P, FIG. 3, are then calculated and routed to the dynamic beamformer 26, FIG. 2, together with the desired steering angles. The location data and the associated propagation delays are recorded on command of the operator. It will be noted that the algorithm includes the software routines both for selecting and controlling the recording option and for selecting recorded data for playback and display. In the playback mode the element locations can be re-calculated from the recorded acoustic delays or displayed directly by bypassing the calculated routines.

The data supplied by the acoustic delay processor 94, FIG. 6, do not represent the actual distance between an active and passive element, 52 and 46, FIG. 3, on two sonobuoys. Rather, they represent the difference in the distance from an active element 52 to the passive element 46 on the same sonobuoy 42A and the passive element 46 on another sonobuoy 42P. Thus, as is shown in FIG. 12, the actual distance, a+c and b+c, are found by adding the length of cable from the hydrophone 46 to the projector 52 on active sonobuoy 42A (called "wirelength") to the outputs of the acoustic delay processor 94, FIG. 6. It should be noted that the outputs of the processor 96, FIG. 6, are of two kinds: source-to-source distances, b+c, representing the time delay between an active element 52 and the receiving element 46 on a second active sonobuoy 42A, and source-to-receiver distances, a+c, representing the time delay between an active element 52 and the receiving element 46 on a passive sonobuoy 42P.

The location of the receiving element 46 on the active sonobuoy 42P is calculated first from the source-to-source distances, b+c. A coordinate system is defined whose origin is at the location of the receiving element 46 on active sonobuoy #1 and whose positive axis passes through the location of the receiving element 46 on active buoy #2. The Y-coordinate of the receiving element 46 on active buoy #2 is derived from the measured propagation delay from active buoy #1 to active buoy #2. The x and y coordinates of the receiving elements 46 on active buoys #3 and #4 are then obtained by solving a pair of triangles whose apexes are defined respectively by the location of the receiving elements 46 an active buoys #1, #2, and #3 and #1, #2, and #4. The ambiguity as to whether active buoys #3 and #4 fall on the positive or negative side of the x-axis is resolved by solving the triangle whose apexes are at the location of the receiving elements on active buoys #2, #3, and #4. The z-coordinate or relative depth of the receiving elements 46 is determined by a similar method in which the "wirelengths" c of pairs of buoys 42 are defined as the sides of a parallelogram whose diagonals are the distances between the buoys. For this purpose the algorithm assumes that the cables, 54 and 56, by which the receiving element 46 and active sources 52 are suspended are straight and parallel, though not necessarily perpendicular to the surface of the ocean.

To minimize the effects of errors in the measured propagation delay data, the above calculations are refined by an iterative method that dithers the element coordinates until a minimum is found for the sum of the squares of the differences between the square of the measured and calculated source-to-source distances; that is by minimizing "error" $\epsilon$ defined as $$\varepsilon = \sum_n (C_n^2 - M_n^2)^2, \qquad (3)$$

where n identifies a pair of sonobuoys, 42, C is the source-to-source distance, b+c, calculated from the buoy locations, and M is the source-to-source distance measured by the acoustic delay processor 94, of FIG. 6. This calculation is accomplished one buoy 42 and one coordinate at a time.

When the relative location of the receiving element 46A on the active buoys 42A has been determined, the location of the elements 46P on the passive buoys 42P is calculated from the source-to-receiver distances, a+c. In this case, each element 46P is treated independently and its location calculated before proceeding to the next. The x and y coordinates of the element 42P are estimated first, using information from active buoys #1, #2, and #3. The error in these estimates is then minimized by an iterative procedure similar to that used for the active buoys 42A. During this procedure the z-coordinate is found and the information from active buoy #4 assimilated. This method was chosen because of its simplicity of implementation on the Nova 800 minicomputer, 152 in FIG. 10. It allows the location triangles to be readily solved without time-consuming calculation of sines and cosines and with minimum use of the square root.

The position tracking algorithm 160, FIG. 11, calculates x, y, and z coordinates for 31 sonobuoys in a minimum time of 0.1 second and a maximum time of 5.0 seconds. The time depends on the accuracy of the input data provided by the acoustic delay processor, 94 in FIG. 6, and the desired accuracy of the output locations but not on the number of previous location calculations. That is, as much time is required to update the element locations as to calculate them initially. Location accuracy can be traded for execution speed by eliminating computation of the error$\epsilon\epsilon$. In this case, however, the z-coordinate is not calculated for the passive buoys 42P. It will be noted that, since the location of the receiving element 46P on each passive buoy 42P is independently calculated, the algorithm 160 is not limited to an array of any particular number of receiving elements 46.

Memory requirements for the 31-element random array system 20, FIG. 2, are 4600 words for the program and 1900 words for data. The Nova 800 computer has a memory capacity of 32,000 words.

The algorithm 160 is designed to prevent the location calculating process from introducing any significant error beyond that inherent in the 16-bit word length of the data of the acoustic delay processor 94, FIG. 6. Such accuracy is especially difficult to achieve in the error computation, and at one stage required the use of 6-precision arithmetic, equivalent to a word length of 96 bits. A discussion of the error susceptibility of the algorithm is provided in appendix C, hereinbelow.

The operator interface with the system will now be described in great detail. The system operator, after starting the position tracking algorithm 160, FIG. 11, may intervene at any time by typing commands on the keyboard of the graphics terminal 154, FIG. 10. When a command is entered, an interupt service routine identifies it and starts the appropriate interrupt subroutine. When execution of the subroutine is complete, the interrupt service routine causes the algorithm to continue execution of the main program from the point at which it stopped.

Following is a description of the principal operator commands currently implemented in the position tracking software 160, FIG. 11. It will be noted that some commands simply cause the graphics terminal 154, FIG. 10, to display processing parameters or calculated data. The operator may specify, as noted hereinabove, whether the data to be processed are to come from the acoustic delay processor 94, FIG. 6, or magnetic tape from tape recorder 156, FIG. 10; whether new element locations are to be calculated; and whether data are to be recorded. In the absence of an operator input, the program automatically selects data from the acoustic delay processor 94, FIG. 6, calculates new element locations, and records the calculated locations and associated propagation delays.

The operator may specify the steering angles for the beamformer 26, FIG. 2. These angles, entered in degrees of elevation and in degrees of azimuth relative to true north, are converted to direction cosines by the program. If the operator desires he may specify only a sector of coverage and let the program also determine the individual steering angles. In the absence of an operator input, the program selects steering angles of 0 degrees in elevation and 0 to 360 degrees in azimuth.

The operator may specify the direction of true north if an appropriate reference is available. Such a reference consists, for example, of a radar target simultaneously held as an acoustic target. In the absence of an operator input, true north is assumed to be in the direction from active buoy #1 to active buoy #2, that is, in the direction of the positive x-axis of the position tracker's coordinate system.

The operator may select a different "wirelength" c, FIG. 12, if it is desired to use a different length of cable 54 between the hydrophone 46A and projector 52 on the active sonobuoys 42A. He may designate any sonobuoy 42 as "disabled" if it is not working properly, preventing loss of time in attempting to calculate its position. He may suppress calculation of the z-coordinates if it is desired to increase the speed of computation by assuming all hydrophones 46 to be at the same depth.

The operator may specify how the locations of the elements 46 are to be displayed on the graphics terminal 154, FIG. 10, including viewing angle and scale. He may also select other information for display, such as the beam steering angles, the status of the sonobuoys 42, or the error values associated with each element location calculation.

The operator may set the computer's real-time clock to any time of day. The clock time is recorded and sent to the beamformer 26, FIG. 2, insuring that all subsystems are synchronized.

The number of beams required to provide full 360-degree horizontal and significant vertical coverage with the random array is as much as two or three orders of magnitude greater than the number of elements in the array. Further, since the position of the elements is continually changing, the time delays used in the beamforming process must be dynamically adjustable. The requirement to generate a large number of beams from a time-varying array of elements defines the unique aspect of the random array beamforming problem.

Reference is now directed to FIG. 13, wherein is a simplified functional diagram of the beamformer 180 used in this invention. The random array dynamic beamformer 180 is based on the conventional time-delay-and-sum technique, as opposed to the partial sums technique, which is more efficient when the number of receiving elements exceeds the number of beams. It forms up to 1600 beams over a frequency band of 6–400 Hz and a time-delay field of 1.8 seconds, corresponding to a maximum element separation of approximately 2700 meters (9000 ft). It is presently configured to operate with a two- or three-dimensional random array of 32 receiving elements. As indicated hereinbelow, however, the design readily permits expansion to accommodate an unlimited number of receiving elements.

The three principal functional units are the signal acquisition and conditioning unit, 182, which extracts and quantizes the low-frequency portion of the element output spectrum; the program control and data formatting unit 184, which formats and combines the conditioned element data with the element position information generated by the array element locating system 90, FIG. 6; and the beamforming unit 186, which stores the data and performs the time-delay and summing operations. A Tandberg TDI 1050 digital magnetic tape recorder 188 provides a means of recording the conditioned element outputs and associated element position data for subsequent processing or reprocessing.

Reference is now directed to FIG. 14, wherein is illustrated the signal acquisition and conditioning unit 200. Analog signals of maximum amplitude 0.5 volt rms from the AN/ARR-72 receiver 32, FIG. 2, are sent in parallel to the signal-conditioning unit 200, which consists of 32 channels of filters and amplifiers followed by sampling, multiplexing, and quantizing circuitry. It will be noted that there is one more channel, the bottom channel, than the maximum number of array elements permitted by the 31 receiving channels of the receiver 32, FIG. 2.

The input signals first pass through a simple resistance-capacitance band-pass filter 202 that removes low-frequency noise below 6 Hz caused by ocean wave action and high-frequency noise above 1 kHz generated by the element locating system 90, FIG. 6. This filter 202 has a buffer amplifier stage 204 at its output to reduce its insertion loss to 0 dB.

Following the buffer amplifier 204 is a precision amplifier 206 whose gain is selectable in eight steps from 0–20 dB. The selected gain is the same for all channels. A provision for trimming the individual channels to compensate for differences in sonobuoy sensitivity was determined to be unnecessary, since typical sonobuoy sensitivities are sufficiently uniform not to limit the array's performance under all but the most noise-free conditions.

Connected to the output of the precision amplifier 206 is a two-pole active low-pass filter 208 with an adjustable cut-off frequency which allows selection of one of four signal bands: 10–50 Hz, 10–100 Hz, 10–200 Hz, or 10–400 Hz. This filter 208 is for spectral shaping only; its roll -off is not sharp enough to prevent aliasing.

Following the adjustable low-pass filter 208 is the anti-aliasing filter 210, a seven-pole elliptical low-pass filter with a cut-off frequency of 400 Hz and a rejection of greater than 60 dB at all frequencies above 540 Hz. A gain of 28 dB in the pass-band increases the strength of weak signals to the level required to drive the analog-to-digital converter 218.

Each input channel has an individual sample-and-hold circuit 214 operating at 2 kHz. All channels are sampled simultaneously, and thus no compensating delays are necessary for accurate beamforming. The sample d values are multi plexed in multiplexer 216 and converted to 8-bit digital format at a speed of 72 kHz. Eight bits allows a 48-dB signal dynamic range. The 72-kHz operating speed accommodates the sampled data from each of the 32 channels and allows time to subsequently insert the element position information in the data stream.

The anti-aliasing filter 212 of the signal-conditioning unit 200 was chosen in conjunction with the input sampling rate to prevent out-of-band sea-state noise from folding into the signal band of interest. A sampling rate of greater than 800 Hz was required to satisfy the Nyquist criterion for the 10–400 Hz band. A higher rate was desired to reduce the quantization error to a level that would permit simple two-point linear interpolation to be used to reconstruct a finer time delay increment. A rate of 2 kHz was chosen as adequate for interpolation purposes. The output of the beamformer 180, FIG. 13 can then be represented with a 1-kHz sampling rate, selecting every other sample, without significant aliasing errors.

Elliptical filters 212 have nonlinear phase shifts; but as long as these phase shifts are constant from channel to channel, array gain will not be degraded. The elliptical filters 212 in the beamformer 180, FIG. 13, have one percent component tolerances in an effort to keep channel-to-channel phase differences to less than 10 degrees.

The program control and data formatting unit 220, shown in FIG. 15, governs the formatting of data and their distribution to and use by the beamforming unit 186, FIG. 13. The basic hardware element of the unit 220 is a Texas Instrument 990 microcomputer 222, to which four identical computers in the beamforming unit, 186 of FIG. 13, are slaved.

The program control computer 222 accepts the element position and steering vector data from the locating system 90, FIG. 6. The element position data are combined with the multiplexed digital element output data generated by the signal-conditioning unit 200, FIG. 14. The steering vector data, supplied to the beamformer 180, FIG. 13, by the locating system 90, FIG. 6, as 16-bit direction cosines, are distributed to the beamforming unit 186, FIG. 13, independently of the element position data.

An important feature of the beamformer 180, FIG. 13, is the integral data recording capability. The element output data and the element position data are reformatted and combined in data formatter 224, and are then recorded directly on a standard 9-track digital tape transport 226 at 45 inches per second and 1600 bytes per inch, equivalent to the input sampling rate of 72 kHz. This recording capability permits the original element data to be replayed through the beamformer 180, FIG. 13, for off-line analysis.

The comments made hereinabove with respect to modular expandability do not apply to the data recording. The 32-element system operating at a 2-kHz sampling rate requires the full data-recording capacity of the transport 226.

The beamforming unit 230, FIG. 16, demultiplexes and stores the individual element data and forms up to 1600 simultaneous and independently steered beams by the time-delay-and-sum technique. The unit 230 is constructed of four eight-channel modules each with its own demultiplexer 232, time-delay address computer 234, and summer 236. The time-delay address computers 234 used were Texas Instruments 990 microcomputers slaved to the Texas Instruments 990 program control computer 222, of FIG. 15. The modular construction of the beamforming unit 230 allows unlimited incremental expansion of the number of elements to be processed.

The beamforming task consists of generating a sampled-data time sequence for each selected steering direction. Each sequence is composed of sums of delayed samples of the individual element outputs. The summing operation is expressed as $$v_j(t_k) = \sum_{i=1}^{N} u_i(t_k - \tau_{ij}) \tag{4}$$

The delayed samples $u_i$ are obtained from a continuously updated memory bank 238, which provides random access to the delayed element output field. Summing is performed by a parallel digital adder logic network 236. The memory access and summing rate is 3.2 MHz, 1600 times the 2-kHz input sampling rate, allowing the formation of up to 1600 beams in each 500-microsecond sampling interval.

The memory bank of the beamforming unit 230 includes an independent memory unit, called an element signal processor (ESP) memory 238, for each element. These units 238 are accessed simultaneously to obtain the set of N element samples. Four kilobytes of memory are required to accommodate a differential time delay, corresponding to the maximum element separation expected, of 1.8 seconds. An additional 12 kilobytes, respresenting 6.4 seconds of real-time data, are provided for computing new time delays from the updated element positions.

The procedure for computing the time delays is as follows. A presettable counter is used as an address generator for each member unit 238. Each counter is set to a starting address corresponding to its required time delay. The counters run synchronously at the 3.2-MHz rate for 12 kilosamples, taking approximately 4 milliseconds to generate a high-speed replica of 6.4 seconds of real-time data. During the 4-millisecond interval the time-delay address computers calculate the arithmetic scalar product between the selected beam steering vector and a new set of element position coordinates to generate the delays for the next 6.4-second sequence of beams. In the event of failure of the program control computer 222, FIG. 15, or the locating system 90, FIG. 6, the beamforming unit 230, FIG. 16, continues to operate, using the last calculated set of time delays.

Unless some form of interpolation is used, a 2-kHz sampling rate means that the time delays for beamforming can be no more accurate than ±0.25 milliseconds. This is not quite adequate, at a signal frequency of 400 Hz, to reduce side-lobe errors below the level warranted by the anticipated gain of a 32-element array. The beamformer 230, FIG. 16, thus reduces the time-delay error with a two-point interpolation. Suppose a time delay calculated by the time-delay address computer 234, FIG. 16, falls between two sample times at which the signal values are A and B. The summer 236 has a choice of values to use: A, or 0.75A+0.25B, or 0.5A+0.5B, or 0.25A+0.75B, or B. The choice is based on where the calculated time delay falls with respect to the two sampling times. Though the true reconstruction of the signal is more complex, this approximation is accurate enough to reduce errors to a negligible level.

The principal beamformer output, called BEAM BLOCK DATA in FIG. 16, is a serial data stream compressed in time by a factor of 1600. It contains 6.4 seconds of data from each beam compressed into 4 milliseconds. These data can be readily decompressed in a buffer memory and selected beams extracted at the real-time rate of 1 kHz for narrow-band spectral analysis.

A system clock 244 is provided for temporal synchronization of the circuits which require it, specifically buffer memory 238.

An alternate output called BEAM SCAN DATA is also available. In this output each 6.4 seconds of compressed beam data is detected and integrated, in circuit 246, converted in D/A converter 248, to produce the total broadband energy in each beam.

The method of storing the element outputs and forming beams is schematically illustrated in FIG. 17. Each square of the figure represents one 8-bit sample of the output of one receiving element 46, FIG. 3. The total memory storage capacity is given by the product of the number of samples per channel, 16,384, and a number of channels, 32, namely, 524,288.

The random array system 20, as is illustrated in FIG. 2, is designed to be deployed by a P-3C antisubmarine patrol aircraft and to be operated with the aircrafts AN/ARR-72 radiotelemetry receiver 32 and AN/AQA-7 narrowband spectral analyzer 34. The receiver 32 contains 31 crystal-controlled receiving channels that are normally connected to the analyzer 34 through a switching assembly 36. By interrupting this connection and inserting the random array system 20 in series with the aircraft system, the telemetered sonobuoy data are presented to the array element locating system 24 and beamformer 26, and the beamformer outputs may be made available for selection and processing by the analyzer 34. This change may be accomplished without modification of the receiver 32 or analyzer 34 hardware.

The random array beamformer 180, FIG. 13, produces up to 1600 beams of digital data. Its beam block serial output, containing the data for all 1600 beams, is time-compressed by a factor of 1600. An auxiliary buffer memory 264, FIG. 18, therefore, in the buffer interface system 264, is thus required to decompress the data and separate them into parallel outputs before spectral analysis. It is also necessary to convert the data from digital to analog format, in D/A converter 266, and clock them out of the buffer memory 264 at a rate compatable with the input requirements of the spectrum analyzer 34, FIG. 2.

A buffer interface system 260, which is capable of performing these functions, produces up to 32 parallel analog outputs clocked out at 1000 Hz. These 32 outputs, each representing one of the 1600 beamformer outputs, are selectable by the random array operator at the graphics terminal 154, FIG. 10, of the locating system position tracker 150. As noted hereinabove, there is one more output than can be routed to the analzer 34, FIG. 2, through the 31 channels of the switching assembly 36 of receiver 32.

APPENDIX A. DESIGN AND OPERATION OF ACOUSTIC DELAY PROCESSOR

FIG. 19 illustrates the structure 280 and data flow of the acoustic delay processor. Abbreviations used are CP—control processor 282
CM—control memory 284
RP—reference processor 286
RM—reference memory 288
DP—delay processor 292

The localization signals generated by the four active reference sonobuoys 52, FIG. 3, are routed to the reference processors 286. The reference processors 286 store each reference in the corresponding reference memory 288, replacing the oldest data with the new data.

The four localization signals received by the passive sonobuoys 46, FIG. 3, are routed to the delay processors 292. The delay processors 292 correlate these respectively with each of the four references. When a correlation is found, the correlation peak amplitude and propagation delay are also stored in the corresponding reference memory 288.

The reference processors 286 collect the correlation data from their respective reference memories 288 and send the data to the control memory 284 which the control processor 282 accesses for display and output.

Control Processor

The control processor 282 displays the correlation coefficient and propagation delay data from the control memory 284 and outputs the identity of each active and passive sonobuoy pair, 52 and 46, FIG. 3, along with the propagation delay between them to the general purpose interface bus (IEEE Standard 488-1975).

The control processor design provides the following functions:

1. Self-test mode for checking and servicing the acoustic delay processor 280 independently of the rest of the system.
2. Timing strobes to coordinate the operation of the acoustic delay processor 280.
3. Power-on initialization.
4. Sample counter bus.
5. Microprocessor support.
6. Operator interface.
7. Display interface.
8. Control memory 284 interface.
9. IEEE interface bus.

When power is applied, the self-test circuit is initialized, and all the microprocessors in the acoustic delay processor 280 are reset while timing strobes clock the microprocessors, the time-shared memory circuits, and the IEEE interface. Additional strobes derived from the clock are used to count samples and to mark each group of eight samples. The sample counter bus indicates the location in the reference memories 288 of the samples arriving at the reference processors 286.

A pseudorandom noise generator provides a test reference, and passing it through a shift register delay provides a test signal. With the acoustic delay processor 280, FIG. 19, connected from the data conditioning unit 100, FIG. 7, the self-test mode is selected when the front panel toggle switch 302 is in the position marked TEST, FIG. 20.

The front panel 300, shown in FIG. 20, allows an operator to monitor the correlation data, to select either the TEST or the OPERATE mode, and to reinitialize any of the delay processors 292. The indicator marked ADDRESS TO SEND lights when the position tracker 150, FIG. 10, addresses the acoustic delay processor 280, FIG. 19, to talk, and correlation data are communicated from the acoustic delay processor to the position tracker. A thumbwheel switch 304 selects a sonobuoy for which the correlation coefficient and propagation delay with respect to each of the four reference sonobuoys 52, FIG. 3, to displayed. A pair of pushbuttons opposite each of the displays controls the operation of the delay processors. Depressing the white pushbutton causes the letter "D" to appear in the corresponding displays, indicating that data transfer to the IEEE interface for the selected sonobuoy pair has been inhibited. Depressing the red pushbutton until the letter "E" appears in the corresponding displays reinitializes the delay processor 292, FIG. 19, for the selected sonobuoy pair and restores data transfer to the IEEE interface.

Control Memory

The control memory 284 collects and buffers the correlation data from up to fifteen reference processors 286 to the control processor 282 and carries message traffic between them.

Design

The control memory 284 design provides these functions:

1. Priority recognition and grant for the control processor 282 and up to fifteen reference processors 286.

2. 4096 bytes of random access memory available to the control processor 282.

3. Subaccess to 256 bytes of memory for each reference processor 286.

4. Read/write cycle control.

The control memory 284 buffers correlation data and program flags between the control processor 282 and the reference processor 286. The processors 282 and 286 all share the control memory's address and data lines, so that only one request for access may be granted at a time. Once a request is granted, other requests are ignored until the former is withdrawn.

While the control processor 282 can access all 4096 bytes of the control memory 284, each reference processor 286 can access only one 256-byte block assigned to it. Each block holds the correlation coefficients and propagation delays from up to fifteen passive sonobuoys 46, FIG. 3, with respect to each of the four active sonobuoys 52.

Reference is now directed to FIG. 21. The first byte of each correlation coefficient has two program flags 322 and 324. The first is the data enable flag 322 which indicates that data is to be transferred to the IEEE interface. The second is the data transfer flag 324, which indicates that the control processor 282 has read the data and is waiting for new data. When a reference processor 286 stores new data, it clears the data transfer flag 324 to signal that new data is ready.

When a request is granted, a control memory 284 cycle is initiated. A delay of half a clock period allows the requester time to drive the address, read/write, and data lines to stable states. The appropriate memory location is enabled until the request is withdrawn during the read cycle, or disabled after half a clock period for a write cycle. When the request is withdrawn, another delay of half a clock period allows the requester to free the lines before the next request is granted. The memory cycle requires a total of three clock periods. Care must be taken with the software to allow all other requesters time before requesting another access to prevent locking out lower priority requesters indefinitely.

Reference Processor

The reference processor 286, FIG. 19, stores the reference samples from each of the four active sonobuoys 52, FIG. 3, into the reference memories 288, respectively, and coordinates the operation of the delay processors 292. It also averages the correlation data from each delay processor 292 and stores the averaged data into the control memory 284.

The reference processor 286 design provides these functions:

1. Microprocessor support.
2. Reference memory 288 interface.
3. Control memory 284 interface.
4. Data conditioning unit 100, FIG. 7, interface.
5. Timing strobe buffering to reference memories 288.
6. Test signal buffering to delay processors 292.
7. Reference sample registers and buffers.

Each reference processor 286 buffers the timing strobes from the control processor 282 to four memories 288 and the test signal to the delay processors 292. Every eight samples a strobe from the control processor 282 interrupts the reference processors 286, causing them to store the current eight samples from the data conditioning unit 100, FIG. 7, into the corresponding reference memory 288 at the location indicated by the sample address bus for each of the active sonobuoys 52, FIG. 3.

Most of the software controlling the delay processors 292, FIG. 19, resides in the reference processors 286. Each delay processor 292 is initialized as a correlator to search eight consecutive sample delays for a peak exceeding threshold and persistence criteria. A tracking feature locks the search range to the delay where a peak is discovered in case unfavorable propagation conditions interfere temporarily with the correlation process. A history of ten correlation coefficients and propagation delays is maintained for each delay processor 292 and summed to reduce the random errors in the measurements. The sums are then stored into control memory 284.

Reference Memory

The reference memory 288 collects and buffers the correlation data from up to fifteen delay processors 292 to a reference processor 286 and carries message traffic between them. It also holds 1.6 seconds of reference samples from an active sonobuoy 52, FIG. 3, for the delay processors to correlate.

The reference memory 288 design provides these functions:

1. Priority recognition and grant among a reference processor 286 and up to fifteen delay processors 292.

2. 2048 bytes of random access memory available to a reference processor 286 for storing reference samples and correlation parameters.

3. Subaccess to 64 bytes of memory for each delay processor 292 for storing correlation data.

4. Subaccess to 1024 bytes of memory containing the reference samples for the delay processors 292.

5. Read/write cycle control.

6. Timing strobe buffering to the delay processors 292.

Attention is now directed to FIG. 22, wherein is shown the organization 340 of a reference memory 288, FIG. 19. A reference memory 288 contains 2048 8-bit bytes of random access memory. One half buffers the correlation data 342, FIG. 22, between the delay processors 292, FIG. 19, and a reference processor 286 and the other half holds the reference samples 344, FIG. 22, from an active sonobuoy 52, FIG. 3. A reference processor 286, FIG. 19, and up to fifteen delay processors 292 all share a reference memory's address and data lines, so that only one request may be granted at a time. Once a request is granted, other requests are ignored until the former is withdrawn.

Although a reference processor 286 has access to all 2048 bytes of a reference memory 288, each delay processor 292 can access only the 64-byte block assigned to it and the 1024 bytes containing the reference samples 344, FIG. 22. Each 64-byte block holds the correlation parameters and data for a delay processor 292, FIG. 19.

When a memory request is granted, a reference memory, 288, cycle is initiated. A delay of half a clock period allows the requester time to drive the address, read/write, and data lines to stable states. The appropriate memory location is enabled until the request is withdrawn during a read cycle or disabled after half a clock period during a write cycle. When the request is withdrawn, another delay of half a clock period allows the requester to free the lines before the next request is granted. The entire memory cycle requires three clock periods. Care must be taken in the software to allow all other requesters time before requesting another access to prevent locking out lower priority requesters indefinitely.

Delay Processor

The delay processor 292, FIG. 19, correlates 1000 localization reference samples 344, FIG. 22, in a reference memory 288, FIG. 19 with a localization signal at eight consecutive sample delays every 200 milliseconds.

The delay processor design provides these functions:
1. Microprocessor support.
2. Visual indication of a correlation exceeding a given threshold.
3. Reference memory 288 interface.
4. Data conditioning unit 200, FIG. 14, interface.

The delay processors 292, FIG. 19, are the matched-filter detectors of the acoustic delay processor structure 280.

A delay processor 292 waits for initialization from a reference processor 286 via a reference memory 288 and immediately begins correlating 1000 samples from the reference memory with the incoming samples from the data conditioning unit 200, FIG. 14, for eight consecutive sample delays. At a sample rate of 5 kHz this process requires 200 milliseconds.

When 1000 samples have been correlated for the eight time delays, the delay processor 292, FIG. 19, finds the largest correlation coefficient and compares it with a threshold value. If the threshold is exceeded, the delay processor 292 lights an indicator and passes the correlation coefficient and the delay window number to the reference memory 288. The reference processor 286 calculates the total delay, averages the delay and coefficient with the previous nine, and passes the averages to the control memory 284. The reference processor 286 then reinitializes the delay processor 292 information in the corresponding reference memory 288 for the next correlation cycle so that the next peak value occurs in the middle of the delay processor's eight-delay window. If no correlation was found, the delay processor 292 extinguishes the indicator and waits for the next correlation cycle.

APPENDIX B. ACCURACY OF ACOUSTIC DELAY PROCESSOR

The locating system 90, FIG. 6, calculates element positions by first measuring all interelement distances, a+c and b+c, FIG. 12. Continuous band-limited white noise was chosen as the acoustic signal for making this measure because (1) it would be resistant to selective frequency fading caused by different propagation paths (multipath); (2) it would not require a precise interbuoy timing chain, such as would be needed with a pulsed system; and (3) hard-clipped matched-filter detectors could be easily implemented to detect the correlation pairs with sufficient gain to keep the transmit power requirements of each active element low.

At a sound speed of 1500 m/sec the ±0.375 m resolution required for accurate beamforming at 400 Hz is equivalent to a correlation delay measurement accuracy of ±0.25 msec. The accuracy of the automatic data processing (ADP) depends partly on the signal bandwidth and partly on the signal-to-noise ratio.

The temporal resolution of a broadband correlation process is approximatley equal to the inverse of the signal bandwidth used:

$$\Delta \tau \cong \frac{1}{BW} \quad (5)$$

where $\Delta \tau$ is the mean resolvable correlation delay interval and BW is the signal bandwidth. A signal bandwidth of 1/0.25 msec=4 kHz would provide the resolution desired but would be impractical to implement considering that four separate bands are needed in the locating system 90, FIG. 6. Since BW=1000 Hz was chosen as the easiest to implement within the sonobuoy constraints, the mean resolvable correlation delay interval $\Delta \tau$=1 msec is four times too large for adequate spatial resolution.

Resolutions better than $\Delta \tau$ are possible (1) by averaging several correlation delays together or (2) when high signal-to-noise ratios allow a better peak estimation than the (sin x)/x correlation function 3-dB down points.

Averaging Measurements

Greater accuracy in measuring the correlation delay $\tau$ is possible by taking the average of N independent measurements:

$$\bar{\tau} = \frac{1}{N} \sum_{i=1}^{N} \tau_i. \quad (6)$$

Since the mean resolvable correlation delay interval $\Delta \tau$ is an rms value, its expected improvement from averaging is noted:

$$\Delta \bar{\tau} = \frac{\Delta \tau}{\sqrt{N}} = \frac{1}{BW \sqrt{N}}. \quad (7)$$

A practical BW was determined to be 1000 Hz so that $$N > \left[ \frac{1}{(10^3)(0.25 \times 10^{-3})} \right]^2 = 16 \quad (8)$$

or at least 16 independent correlations would have to be averaged together if averaging alone were used to reduce $\Delta \tau$ to the required 0.25 msec.

Since the buoys continue to drift during the averaging process, it is important that the averaging intervals be kept shorter than the mean time needed for buoys to change their separation distance by $\lambda/10$.

A plot of several possible interbuoy drift rates versus the required $\lambda/10$ measurement accuracy (0.375 m) at 400 Hz was made. Based on random array sonobuoy deployment experiments, a relative drift rate of 0.3–1.0 m/min can be expected. Partial array deployments in the northeast Pacific in August 1976 and near San Elemente Island in September 1977 resulted in average interelement drift rate measurements of 0.2 m/min and 0.5 m/min respectively. If we consider 5 m/min the worst drift rate that might be encountered then no more than 4½ seconds in delays can be averaged before the relative drift begins to dominate.

Although correlations in the automatic data processing are attempted every 200 msec, only about 50 percent of the correlation coefficients exceed the threshold that has been chosen as optimal. The intersection of a dotted line representing the expected 2½ correlations per second rate with a $\lambda/10$ at 400 Hz line indicates that about a 6.4-second average will be required to produce the 16 correlations needed to reduce $\Delta \tau$ to the required 0.375 m. Since this may be a significant interval when large drift rates are encountered and since additional accuracy is expected from a high S/N, only 10 correlations (spanning about 4 seconds) were made.

Obviously, many modifications and variations of the present invention are possible in the light of the above teachings, and, it is therefore understood that within the scope of the disclosed inventive concept, the invention may be practiced otherwise than as specifically described.

What is claimed is:

1. A system for locating transducer elements suspended from a randomly dispersed, untethered, array of a plurality of N sonobuoys, the elements comprising a plurality of M active, transmitting, transducer elements, each of which generates one of M reference signals, $R_A$, $R_B$, ..., $R_M$, and a plurality of N passive, receiving, transducer elements, N>M, the system comprising:

means for conditioning data, adapted to receive high-frequency element-locating signals and processing them so that they are quantized at its output;

means for processing delayed acoustic signals, whose input is connected to the output of the means for conditioning data, which correlates the reference signal R received from an active element with a corresponding received signal from another element, active or passive, suspended from another sonobuoy; and tracking means, whose input is connected to the output of the means for processing the acoustic delay, for calculating the relative position of each element of the random array from the propagation delays measured by the means for measuring the acoustic delay.

2. The locating system according to claim 1, wherein the means for conditioning data comprises a plurality of N modules, each module processing a signal from one of the N passive transducer elements, each module comprising:

first means for filtering high-frequency signals, for eliminating direct-current energy and discriminating against other acoustic energy below 7 kHz;

a buffer amplifier, which may be an operational amplifier, for amplifying input signals;

second means for filtering high-frequency signals, whose input is connected to the means for amplifying, for removing any remaining low-frequency noise;

a plurality of N means for basebanding, whose inputs are connected to the output of the second means for high-pass filtering, for basebanding the signals about the M locating system reference frequencies, $R_A$, $R_B$, ... $R_M$;

a plurality of N means for low-pass filtering, each having an input connected to the output of the basebanding means, for removing energy above a predetermined frequency; and a plurality of N means for detecting, each having an input connected to the output of the means for low-pass filtering, for determining the number of times the signal crosses the zero amplitude level.

3. The locating system according to claim 2 wherein:

the M baseband frequencies are $R_A$=10.5 kHz, $R_B$=13.0 kHz, $R_C$=15.5 kHz, and $R_D$=18.0 kHz.

4. The locating system according to claim 1 wherein the means for processing delayed acoustic signals comprises:

a plurality of MN module processing means for correlating one of the reference signals, $R_A$, ... $R_M$, with one of the N output signals from the means for conditioning data, the output of each delay processor module comprising a signal τ (Jk), where J relates to the subscript of the reference signal, $R_A$, ..., $R_M$, and k relates to a specific passive transducer element, k=1, 2, ..., N.

5. The locating system according to claim 2, wherein the means for processing delayed acoustic signals comprises:

a plurality of MN module processing means for correlating one of the reference signals, $R_A$, ... $R_M$, with one of the N output signals from the means for conditioning data, the output of each delay processor module comprising a signal τ (Jk), where J relates to the subscript of the reference signal $R_A$, ..., $R_M$, and k relates to a specific passive transducer element, k=1, 2, ..., N.

6. The locating system according to claim 4, further comprising:

a plurality of MN threshold-detecting means, having an input which is connected to the output of a delay processor module, for detecting when the output of the module is above a certain predetermined threshold.

7. The locating system according to claim 5, further comprising:

a plurality of MN threshold-detecting means, each having an input which is connected to the output of a delay processor module, for detecting when the output of the module is above a certain predetermined threshold.

8. The locating system according to claim 1, wherein:

the tracking means comprises a special-purpose computer.

9. The locating system according to claim 7, wherein:

the tracking means comprises a special-purpose computer.

10. The locating system according to claim 8, further comprising:

means, having an input to and an output from the computer, for recording the calculated element locations and associated propagation delays for subsequent playback and analysis.

11. The locating system according to claim 9, further comprising:

means, having an input to and an output from the computer, for recording the calculated element locations and associated propagation delays for subsequent playback and analysis.

12. The locating system according to claim 8, further comprising:

means, having an input connected to and an output connected from, the computer for graphically selecting the desired processing parameters and displaying the calculated element locations and other data.

13. The locating system according to claim 11, further comprising:

means, having an input connected to and an output connected from, the computer for graphically selecting the desired processing parameters and displaying the calculated element locations and other data.

14. A random array system comprising:

a plurality of N sonobuoys;

a plurality of N passive transducer elements each suspended from one of the sonobuoys;

a plurality of M active transducer elements, N>M, each active transducer element being suspended below a passive transducer element, each active element transmitting at a different principal operating frequency, $R_A$, $R_B$, ... $R_M$;

wherein the distribution of the passive elements, and therefore of the active elements, is uniformly random and "thinned", that is, the spacing between the elements varies randomly and on the average is much greater than one-half wavelength at any of the principal operating frequencies.

15. The random array system according to claim 14 wherein:

the N sonobuoys are dispersed so as to form a planar array with an aperture in the range of 366 meters.

16. A random array sonar system, which includes a plurality of active and passive transducer elements, comprising:

a system for locating the positions of the passive transducer elements of the random array, by utilizing the signals emitted by the active transducer elements;

a means for dynamically beamforming, whose input is connected to the output of the element-locating system, another input adapted to receive a signal from a, source external to the sonar system the beamforming means being capable of generating up to 1600 beams and able to coherently process low-frequency signals emitted by the active transducer elements; and means for buffering input signals, having two inputs, one connected to the output of the means for element-locating and the other connected to the output of the means for beamforming, and generating an output signal which may be transmitted to the external source.

17. The random array system according to claim 16, wherein the element-locating system comprises:

a plurality of N sonobuoys;

a plurality of N passive transducer elements each suspended from one of the sonobuoys;

a plurality of M active transducer elements, N>M, each active transducer element radiating at a specific operating frequency and each being suspended below a passive transducer element;

wherein the distribution of the passive elements, and therefore of the active elements, is uniformly random and "thinned", that is, the spacing between the elements varies randomly and on the average is much greater than one-half wavelength of any of the operating frequencies.

18. The combination according to claim 16, wherein the means for dynamically beamforming comprises:

signal acquisition means, adapted to receive a radio frequency signal from the receiver, for extracting and quantizing the low-frequency portion of the transducer element output spectrum;

program control means, whose input is connected to the output of the signal acquisition means, with another input connected to the array element locating system, for formatting and combining the conditioned element data with the element position information generated by the array element locating system; and a means for beamforming, whose input is connected to the output of the program control means, for storing the data and performing required time-delay and summing operations.

19. The combination according to claim 18, further comprising:

means, whose input is connected to the output of the program control means, for recording the conditioned element outputs and associated element position data for subsequent processing and reprocessing.

20. The combination according to claim 19 wherein:

the signal acquisition means comprises a plurality of N+1 filter circuits, each comprising:

a bandpass filter, adapted to receive a radio frequency signal, which removes low-frequency noise below 6 Hz caused by ocean wave action and high-frequency noise-above 1 kHz generated by the element-locating system;

buffer means for amplifying, whose input is connected to the output of the bandpass filter, for reducing the insertion loss of the band-pass filter;

means for amplifying, whose input is connected to the output of the buffer amplifying means, which permits amplifying the input signal in precise steps;

a low-pass filter, whose input is connected to the output of the amplifying means, which allows selection of one of a plurality of M signal bands;

an elliptical low-pass filter, whose input is connected to the output of the low-pass filter, which provides an anti-aliasing function;

means whose input is connected to the output of the elliptical filter, for sampling and holding the value of its input signal; the combination further comprising:

means for multiplexing, whose inputs comprise the N+1 outputs of the sample and hold circuits, for multiplexing the input signals; and converting means, whose input is connected to the output of the multiplexing means, for converting its input analog signal into a digital signal.

21. The combination according to claim 18, wherein the program control means comprises:

means, whose input is connected to the output of the array element locating system, for processing the element position and steering vector data from the locating system; and means, whose input is connected to the output of the element and steering processing means for further processing element position data therefrom, another input being the output of the signal acquisition means, the output of the element processing means comprising element output and position data.

22. The combination according to claim 20, wherein the program control means comprises:

means, whose input is connected to the output of the array element locating system, for processing the element position and steering vector data from the locating system; and means, whose input is connected to the output of the element and steering processing means for further processing element position data therefrom, another input being the output of the signal acquisition means, the output of the element processing means comprising element output and position data.

23. The combination according to claim 22, further comprising:

means, whose input is connected to the output of the data formatting means, for recording element output and position data.

24. The combination according to claim 16, wherein the means for beamforming comprises:

a plurality of N/C beamforming modules, where C and N/C are integers, comprising:

means, whose input is connected to the output of the element processing means, for demultiplexing and storing the individual element data;

means, having as its inputs the output of the demultiplexing means and steering vectors from the means for program control, for computing new time delays from updated element position;

means, whose two inputs comprise an output from the demultiplexing means and the means for computing time delays, for generating the values of the N element samples;

means for summing, whose inputs are the outputs of the N/C outputs of the generating means, for summing delayed samples of the individual element outputs;

the means for beamforming further comprising:
second means for summing whose inputs comprise the N/C outputs of the first-named means for summing, for generating beam block data.

25. The combination according to claim 22, wherein the means for beamforming comprises:
a plurality of N/C beamforming modules, where C and N/C are integers, comprising:
means, whose input is connected to the output of the element processing means, for demultiplexing and storing the individual element data;
means, having as its inputs the output of the demultiplexing means and steering vectors from the means for program control, for computing new time delays from updated element position;
means, whose two inputs comprise an output from the demultiplexing means and the means for computing time delays, for generating the values of the N element samples;
means for summing, whose inputs are the outputs of the N/C outputs of the generating means, for summing delayed samples of the individual element outputs;
the means for beamforming further comprising:
second means for summing whose inputs comprise the N/C outputs of the first-named means for summing, for generating beam block data.

26. The combination according to claim 24, further comprising:
means, whose input is connected to the output of the second summing means, for detecting and integrating its input signal; and
means, whose input is connected to the output of the detecting means, for converting its input digital signal to analog form.

27. The random array system according to claim 16, wherein the means for buffering input signals comprises:
means, whose input is connected to the output of the beamforming unit, for sampling and demultiplexing the input data;
means for clocking the input data;
means, whose input is connected to the counter, for controlling the clocking rate;
means, whose input is connected to the means for beamforming, for selecting the beams from the locating system;
means, whose inputs are connected to the outputs of the clocking means and the selecting means, for decompressing the data in the buffer memory and separating the data into N+1 parallel outputs, for subsequent spectral analysis;
a plurality of N+1 means, whose inputs comprise the outputs of the decompressing means and of the clock controlling means, for converting its input data from digital to analog form.

28. The random array according to claim 26, wherein the means for buffering input signals comprises:
means, whose input is connected to the output of the second summer of the beamforming unit, for sampling and demultiplexing the input data;
means, whose input is connected to the output of the sampling means, for decompressing the input data and separating them into N+1 parallel outputs;
means for clocking the input data;
means, whose input is connected to the counter, for controlling the clocking rate;
means, whose input is connected to the means for beamforming, for selecting the beams from the locating system;
means, whose inputs are connected to the outputs of the clocking means and the selecting means, for decompressing the data to the buffer memory and separating the data into N+1 parallel outputs, for subsequent spectral analysis;
a plurality of N+1 means, whose inputs comprise the outputs of the decompressing means and of the clock controlling means, for converting its input data from digital to analog form.

* * * * *